US012718744B2

(12) United States Patent
Kim et al.

(10) Patent No.: US 12,718,744 B2
(45) Date of Patent: Aug. 25, 2026

(54) DISPLAY APPARATUS, ELECTRONIC APPARATUS INCLUDING THE SAME AND METHOD OF DRIVING THE SAME

(71) Applicant: SAMSUNG DISPLAY CO., LTD., Yongin-si (KR)

(72) Inventors: Hyomin Kim, Yongin-si (KR); Gi-Na Yoo, Yongin-si (KR); Sang Min Hong, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/978,441

(22) Filed: Dec. 12, 2024

(65) Prior Publication Data

US 2025/0308436 A1 Oct. 2, 2025

(30) Foreign Application Priority Data

Mar. 27, 2024 (KR) ........................ 10-2024-0042074

(51) Int. Cl.
*G09G 3/32* (2016.01)

(52) U.S. Cl.
CPC ....... *G09G 3/32* (2013.01); *G09G 2310/0267* (2013.01); *G09G 2310/0275* (2013.01); *G09G 2310/08* (2013.01); *G09G 2320/068* (2013.01); *G09G 2330/021* (2013.01)

(58) Field of Classification Search
CPC ............. G09G 3/32; G09G 2310/0267; G09G 2310/0275; G09G 2310/08; G09G 2320/068; G09G 2330/021; G09G 3/20
See application file for complete search history.

(56) References Cited

U.S. PATENT DOCUMENTS

2017/0154563 A1* 6/2017 Lin .......................... G09G 3/36
2018/0122292 A1* 5/2018 Ju ........................ G09G 3/2092
2021/0104209 A1* 4/2021 Woodgate ................ G09G 3/34
2022/0043939 A1* 2/2022 Acreman ................. G09G 3/18

FOREIGN PATENT DOCUMENTS

KR 10-2022-0008699 A 1/2022

OTHER PUBLICATIONS

Ebaid, et al., "Visual Information Processing in Young and Older Adults", Frontiers in Aging Neuroscience, May 2019, vol. 11, Article 116, 12 pages.

* cited by examiner

*Primary Examiner* — Andrew Sasinowski
(74) *Attorney, Agent, or Firm* — F. CHAU & ASSOCIATES, LLC

(57) ABSTRACT

A display apparatus includes a display panel and a display panel driver. The display panel includes a normal pixel and a viewing angle control pixel having a viewing angle less than a viewing angle of the normal pixel. The display panel driver is configured to drive the display panel. The display panel driver includes a level determiner configured to determine a normal operation period in which at least the normal pixel emits light and a viewing angle control operation period in which at least the viewing angle control pixel emits light in a unit driving period.

23 Claims, 13 Drawing Sheets

| MODE | SENSING | STATE | WP | NP |
|---|---|---|---|---|
| OFF | PRIVACY OFF | NORMAL | 100% | 0% |
| AUTO | NO ADJACENT PERSON | NORMAL | 100% | 0% |
| | OUTDOOR / HIGH MOVEMENT / ADJACENT PERSON EXISTS | SEMI | 50% | 50% |
| | OUTDOOR / LOW MOVEMENT / ADJACENT PERSON EXISTS | | 40% | 60% |
| | OUTDOOR / NO MOVEMENT / ADJACENT PERSON EXISTS | | 30% | 70% |
| | INDOOR / HIGH MOVEMENT / ADJACENT PERSON EXISTS | | 20% | 80% |
| | INDOOR / LOW MOVEMENT / ADJACENT PERSON EXISTS | | 10% | 90% |
| | INDOOR / NO MOVEMENT / ADJACENT PERSON EXISTS | FULL | 0% | 100% |
| ON | PRIVACY ON | FULL | 0% | 100% |

| STATE | WP | NP |
|---|---|---|
| NORMAL | 100% | 0% |
| SEMI PRIVACY | 50% | 50% |
| | 40% | 60% |
| | 30% | 70% |
| | 20% | 80% |
| | 10% | 90% |
| FULL PRIVACY | 0% | 100% |

FIG. 8

| MODE | SENSING | STATE | WP | NP |
|---|---|---|---|---|
| OFF | PRIVACY OFF | NORMAL | 100% | 0% |
| AUTO | NO ADJACENT PERSON | NORMAL | 100% | 0% |
| | OUTDOOR / HIGH MOVEMENT / ADJACENT PERSON EXISTS | SEMI | 50% | 50% |
| | OUTDOOR / LOW MOVEMENT / ADJACENT PERSON EXISTS | | 40% | 60% |
| | OUTDOOR / NO MOVEMENT / ADJACENT PERSON EXISTS | | 30% | 70% |
| | INDOOR / HIGH MOVEMENT / ADJACENT PERSON EXISTS | | 20% | 80% |
| | INDOOR / LOW MOVEMENT / ADJACENT PERSON EXISTS | | 10% | 90% |
| | INDOOR / NO MOVEMENT / ADJACENT PERSON EXISTS | FULL | 0% | 100% |
| ON | PRIVACY ON | FULL | 0% | 100% |

| STATE | WP+NP | NP ONLY |
|---|---|---|
| NORMAL | 100% | 0% |
| SEMI PRIVACY | 50% | 50% |
| | 40% | 60% |
| | 30% | 70% |
| | 20% | 80% |
| | 10% | 90% |
| FULL PRIVACY | 0% | 100% |

DISPLAY APPARATUS, ELECTRONIC APPARATUS INCLUDING THE SAME AND METHOD OF DRIVING THE SAME

CROSS-REFERENCE TO RELATED APPLICATION

This application claims priority under 35 U.S.C. § 119 to Korean Patent Application No. 10-2024-0042074, filed on Mar. 27, 2024, in the Korean Intellectual Property Office KIPO, the contents of which is herein incorporated by reference in its entirety.

BACKGROUND

1. Field

One or more embodiments described herein relate to a display apparatus, an electronic apparatus including the display apparatus and a method of driving the display apparatus.

2. Description of the Related Art

A display apparatus may include a display panel and a display panel driver. The display panel includes a plurality of gate lines, a plurality of data lines and a plurality of pixels. The display panel driver may include a gate driver, a data driver, and a driving controller. The gate driver outputs gate signals to the gate lines. The data driver outputs data voltages to the data lines. The driving controller controls operation of the gate driver and the data driver.

The display panel may include a viewing angle control pixel (a narrow pixel) to facilitate a privacy mode. The viewing angle control pixel emits light having a luminance (perceived by a user from one side of the display panel) that is lower than the luminance perceived by the user from a front surface of the display panel. As a result, in privacy mode, an image of the display panel may be clearly shown from the front surface of the display panel, but may not be well perceived from the side of the display panel.

When operating in a normal mode or the privacy mode is fixed by a user setting, personal information of the user may be exposed to people around the user. Furthermore, when the normal mode or privacy mode is fixed by the user setting, the normal mode or the privacy mode may be fixed for a long time. Consequently, the lifespan of the display apparatus may be reduced due to an excessive use of the normal pixel or the viewing angle control pixel.

SUMMARY

One or more embodiments of the present inventive concept provide a display apparatus that prevents a degradation in lifespan due to an excessive use of a normal pixel or a viewing angle control pixel of a display panel.

One or more embodiments of the present inventive concept may prevent degradation in lifespan without degrading the privacy security of the display apparatus.

One or more embodiments of the present inventive concept may achieve the foregoing improvements by providing a display panel driver operating in variable privacy levels according different conditions, for example, according to different situations of a user.

One or more embodiments of the present inventive concept provide an electronic apparatus including the aforementioned display apparatus.

One or more embodiments of the present inventive concept provide a method of driving a display panel using the aforementioned display apparatus.

In an embodiment of a display apparatus according to the present inventive concept, the display apparatus includes a display panel and a display panel driver. The display panel includes a normal pixel and a viewing angle control pixel having a viewing angle less than a viewing angle of the normal pixel. The display panel driver is configured to drive the display panel. The display panel driver includes a level determiner configured to determine a normal operation period in which at least the normal pixel emits light and a viewing angle control operation period in which at least the viewing angle control pixel emits light. The normal operation period and the viewing angle control operation period are included in a unit driving period.

In an embodiment, the level determiner may be configured to automatically determine a normal state in which a ratio of the normal operation period is 100% in the unit driving period, a full privacy state in which a ratio of the viewing angle control operation period is 100% in the unit driving period and a semi privacy state in which the ratio of the normal operation period is greater than 0% and less than 100% and the ratio of the viewing angle control operation period is greater than 0% and less than 100% in the unit driving period according to a user's environment.

In an embodiment, the level determiner may be configured to determine whether there are adjacent persons around the user. When there is no adjacent person around the user, the level determiner may be configured to determine a state of the display apparatus as the normal state. When there is the adjacent person around the user, the level determiner may be configured to determine the state of the display apparatus as the full privacy mode or the semi privacy state.

In an embodiment, the level determiner may be configured to determine whether there are the adjacent persons around the user using camera data and infrared sensed data.

In an embodiment, the level determiner may be configured to determine whether the user is outdoor or indoor. The ratio of the viewing angle control operation period in the unit driving period when the user is outdoor may be greater than the ratio of the viewing angle control operation period in the unit driving period when the user is indoor.

In an embodiment, the level determiner may be configured to determine whether the user is outdoor or indoor using light sensed data, vibration sensed data, gyro sensed data and position sensed data.

In an embodiment, the level determiner may be configured to determine whether the user is outdoor or indoor further using camera data.

In an embodiment, the level determiner may be configured to determine a degree of movement of the user. As the degree of the movement of the user decreases, the level determiner may be configured to increase the ratio of the viewing angle control operation period in the unit driving time.

In an embodiment, the level determiner may be configured to determine the degree of the movement of the user using vibration sensed data, gyro sensed data and position sensed data.

In an embodiment, the level determiner may be configured to determine whether there are adjacent persons around the user, whether the user is outdoor or indoor and a degree of movement of the user. When there is no adjacent person around the user, the level determiner may be configured to determine a state of the display apparatus as the normal state. When the user is outdoor, the user is moving, the degree of the movement of the user is equal to or greater than a first level and there is the adjacent person around the user, the level determiner may be configured to determine the ratio of the viewing angle control operation period in the unit driving period to a first ratio. When the user is outdoor, the user is moving, the degree of the movement of the user is less than the first level and there is the adjacent person around the user, the level determiner may be configured to determine the ratio of the viewing angle control operation period in the unit driving period to a second ratio greater than the first ratio. When the user is outdoor, the user is not moving and there is the adjacent person around the user, the level determiner may be configured to determine the ratio of the viewing angle control operation period in the unit driving period to a third ratio greater than the second ratio. When the user is indoor, the user is moving, the degree of the movement of the user is equal to or greater than the first level and there is the adjacent person around the user, the level determiner may be configured to determine the ratio of the viewing angle control operation period in the unit driving period to a fourth ratio greater than the first ratio. When the user is indoor, the user is moving, the degree of the movement of the user is less than the first level and there is the adjacent person around the user, the level determiner may be configured to determine the ratio of the viewing angle control operation period in the unit driving period to a fifth ratio greater than the fourth ratio. When the user is indoor, the user is not moving and there is the adjacent person around the user, the level determiner may be configured to determine the state of the display apparatus as the full privacy state.

In an embodiment, the normal pixel may be configured to emit light but the viewing angle control pixel may be configured not to emit light in the normal operation period. The viewing angle control pixel may be configured to emit light but the normal pixel may be configured not to emit light in the viewing angle control operation period.

In an embodiment, light emitting degree of the normal pixel may be 100% and light emitting degree of the viewing angle control pixel may be 0% in the normal operation period. The light emitting degree of the viewing angle control pixel may be 100% and the light emitting degree of the normal pixel may be 0% in the viewing angle control operation period.

In an embodiment, the normal pixel and the viewing angle control pixel may be configured to emit light in the normal operation period. The viewing angle control pixel may be configured to emit light but the normal pixel may be configured not to emit light in the viewing angle control operation period.

In an embodiment, a light emitting degree of the normal pixel may be 50% and light emitting degree of the viewing angle control pixel may be 50% in the normal operation period. The light emitting degree of the viewing angle control pixel may be 100% and the light emitting degree of the normal pixel may be 0% in the viewing angle control operation period.

In an embodiment, even if a ratio of the normal operation period and a ratio of the viewing angle control operation period are changed within the unit driving period, a width of the normal operation period may be configured to be set to be in a predetermined time range.

In an embodiment, when the ratio of the normal operation period and the ratio of the viewing angle control operation period are changed within the unit driving period, a width of the unit driving period and a width of the viewing angle control operation period may be changed but a width of the normal operation period may not be changed.

In an embodiment, the display panel driver may include a gate driver configured to output a gate signal to the normal pixel and the viewing angle control pixel, a data driver configured to output a data voltage to the normal pixel and the viewing angle control pixel, a driving controller configured to control the gate driver and the data driver and a host configured to output input image data and an input control signal to the driving controller. The level determiner may be disposed in the host.

In an embodiment, the display panel driver may include a gate driver configured to output a gate signal to the normal pixel and the viewing angle control pixel, a data driver configured to output a data voltage to the normal pixel and the viewing angle control pixel and a driving controller configured to control the gate driver and the data driver. The level determiner may be disposed in the driving controller.

In an embodiment of an electronic apparatus according to the present inventive concept, the electronic apparatus includes a display panel, a gate driver, a data driver, a driving controller, a host and a plurality of sensors. The display panel includes a normal pixel and a viewing angle control pixel having a viewing angle less than a viewing angle of the normal pixel. The gate driver is configured to output a gate signal to the normal pixel and the viewing angle control pixel. The data driver is configured to output a data voltage to the normal pixel and the viewing angle control pixel. The driving controller is configured to control the gate driver and the data driver. The host is configured to output input image data and an input control signal to the driving controller. The host includes a level determiner configured to determine a normal operation period in which at least the normal pixel emits light and a viewing angle control operation period in which at least the viewing angle control pixel emits based on sensed data of the sensors. The normal operation period and the viewing angle control operation period may be included in a unit driving period.

In an embodiment of a method of driving a display apparatus according to the present inventive concept, the method includes determining a normal operation period in which at least a normal pixel emits light and a viewing angle control operation period in which at least a viewing angle control pixel emits light in a unit driving period, outputting a gate signal to the normal pixel and the viewing angle control pixel and outputting a data voltage to the normal pixel and the viewing angle control pixel. The viewing angle control pixel has a viewing angle less than a viewing angle of the normal pixel.

According to the display apparatus, the electronic apparatus including the display apparatus and the method of driving the display apparatus, the display panel may include the normal pixel and the viewing angle control pixel and the display panel driver may operate in variable privacy levels according to user's situations. The state of the display apparatus may be automatically determined to one of the normal state, the semi privacy state and the full privacy state according to the user's situations. In the semi privacy state, a ratio between a normal operation period and a viewing angle control operation period may be adjusted between 0% and 100% according to the user's situation.

According to an embodiment, a display panel includes a normal pixel having a first viewing angle; a viewing angle control pixel having a second viewing angle less than the first viewing angle; and a display panel driver configured to control the normal pixel to emit light in a first period and to control the viewing angle control pixel to emit light in a second period, wherein a ratio of the first period to the second period varies based on an external condition. The external condition may include whether a person is adjacent to a user of a display device including the display panel. The external condition may include whether the display panel is indoors or outdoors.

The privacy security of the display apparatus may be enhanced by preventing the user's personal information from being exposed to people around the user while the normal mode is fixed. In addition, a decrease of the lifespan of the display apparatus, that would otherwise occur due to the excessive use of the normal pixel or the viewing angle control pixel when the normal mode or the privacy mode is fixed for a long time by the user setting, may be reduced or prevented.

BRIEF DESCRIPTION OF THE DRAWINGS

The above and other features and advantages of the present inventive concept will become more apparent by describing in detailed embodiments thereof with reference to the accompanying drawings, in which:

FIG. 8 is a table illustrating a state of the display apparatus of FIG. 1, the ratio of the normal operation period and the ratio of the viewing angle control operation period according to a privacy off mode, a privacy auto mode, a privacy on mode and different user situations according to an embodiment;

DETAILED DESCRIPTION OF THE INVENTIVE CONCEPT

Hereinafter, the present inventive concept will be explained in detail with reference to the accompanying drawings.

Figure 1:
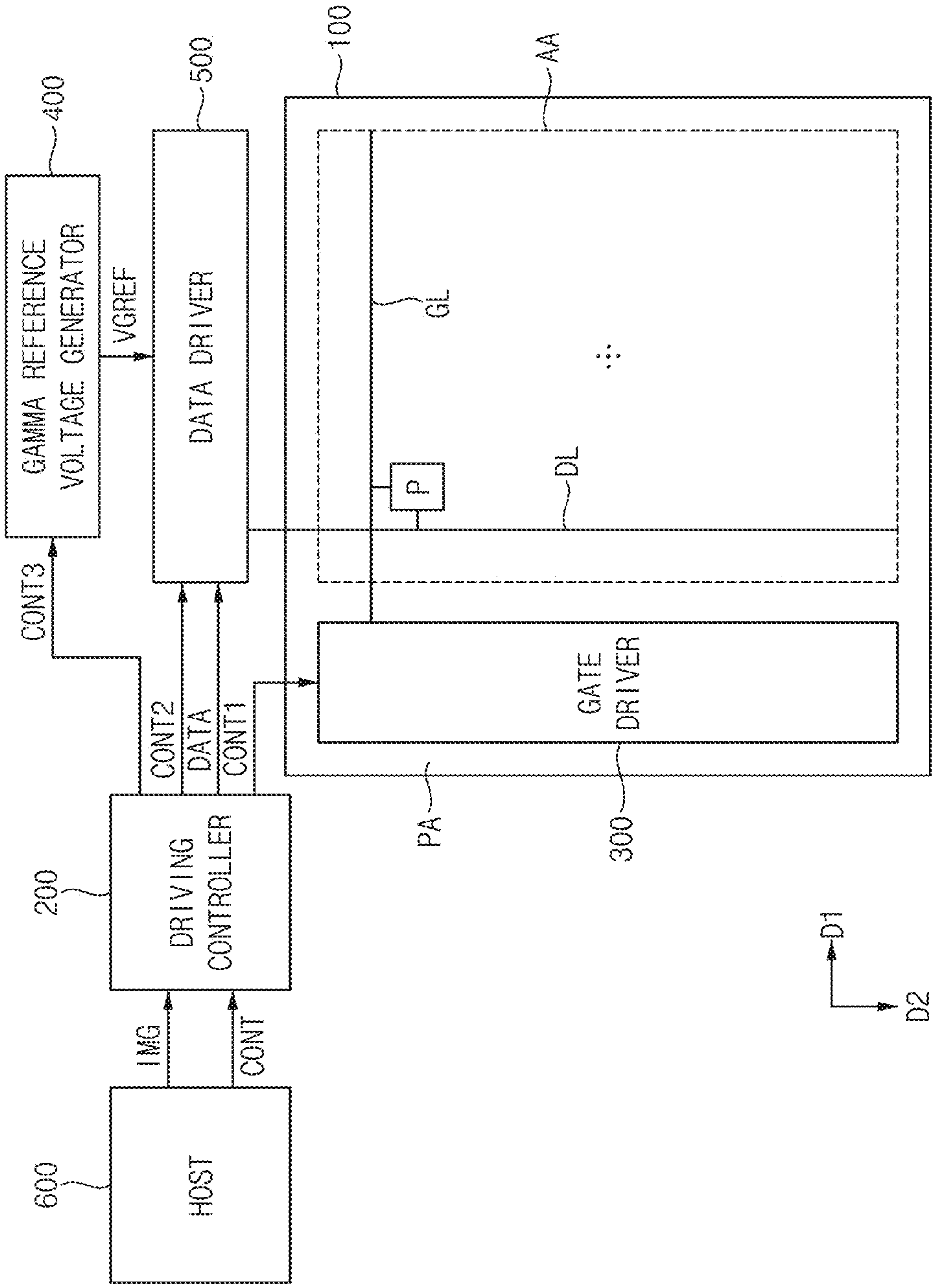
FIG. 1 is a block diagram illustrating a display apparatus according to an embodiment of the present inventive concept.

FIG. 1 is a block diagram illustrating a display apparatus according to an embodiment of the present inventive concept.

Referring to FIG. 1, the display apparatus includes a display panel 100 and a display panel driver. The display panel driver drives the display panel 100. The display panel driver may include a driving controller 200, a gate driver 300, a gamma reference voltage generator 400 and a data driver 500. The display panel driver may further include a host 600. For example, the host 600 may be an application processor. Although the example is described that the host 600 is included in the display apparatus in the present embodiment, in other embodiments the host 600 may be arranged as an external apparatus of the display apparatus.

For example, the driving controller 200 and the data driver 500 may be integrally formed. For example, the driving controller 200, the gamma reference voltage generator 400 and the data driver 500 may be integrally formed. A driving module, including at least the driving controller 200 and the data driver 500 which are integrally formed, may be called to a timing controller embedded data driver (TED).

The display panel 100 may be partitioned into a display region AA and a peripheral region PA. The display region AA may display an image, and the peripheral region PA may be adjacent to the display region AA.

The display panel 100 includes a plurality of gate lines GL, a plurality of data lines DL and a plurality of pixels P connected to the gate lines GL and the data lines DL. The gate lines GL may extend in a first direction D1 and the data lines DL may extend in a second direction D2 crossing the first direction D1.

The driving controller 200 receives input image data IMG and an input control signal CONT from the host 600. The input image data IMG may image data of different predetermined colors. For example, the input image data IMG may include red image data, green image data and blue image data. For example, the input image data IMG may include white image data. For example, the input image data IMG may include magenta image data, yellow image data and cyan image data. The input control signal CONT may include a master clock signal and a data enable signal. The input control signal CONT may further include a vertical synchronizing signal and a horizontal synchronizing signal.

The driving controller 200 generates a plurality of control signals. For example, the driving controller 200 may generate a first control signal CONT1, a second control signal CONT2, a third control signal CONT3 and a data signal DATA based on the input image data IMG and the input control signal CONT.

The driving controller 200 generates the first control signal CONT1 for controlling operation of the gate driver 300 based on the input control signal CONT, and outputs the first control signal CONT1 to the gate driver 300. The first control signal CONT1 may include, for example, a vertical start signal and a gate clock signal.

The driving controller 200 generates the second control signal CONT2 for controlling operation of the data driver 500 based on the input control signal CONT, and outputs the second control signal CONT2 to the data driver 500. The second control signal CONT2 may include, for example, a horizontal start signal and a load signal.

The driving controller 200 generates the data signal DATA based on the input image data IMG. The driving controller 200 outputs the data signal DATA to the data driver 500.

The driving controller 200 generates the third control signal CONT3 for controlling operation of the gamma reference voltage generator 400 based on the input control signal CONT, and outputs the third control signal CONT3 to the gamma reference voltage generator 400.

The gate driver 300 generates gate signals driving the gate lines GL in response to the first control signal CONT1 received from the driving controller 200. The gate driver 300 outputs the gate signals to the gate lines GL. For example, the gate driver 300 may sequentially output the gate signals to the gate lines GL. For example, the gate driver 300 may be mounted on the peripheral region PA on one side of the display panel 100. For example, the gate driver 300 may be integrated into the peripheral region PA of the display panel 100.

The gamma reference voltage generator 400 generates a gamma reference voltage VGREF in response to the third control signal CONT3 received from the driving controller 200. The gamma reference voltage generator 400 provides the gamma reference voltage VGREF to the data driver 500. In an embodiment, the gamma reference voltage generator 400 may be disposed in the driving controller 200 or in the data driver 500.

The data driver 500 receives the second control signal CONT2 and the data signal DATA from the driving controller 200, and receives the gamma reference voltages VGREF from the gamma reference voltage generator 400. The data driver 500 converts the data signal DATA into analog data voltages using the gamma reference voltages VGREF. The data driver 500 outputs the data voltages to the data lines DL.

Figure 2:
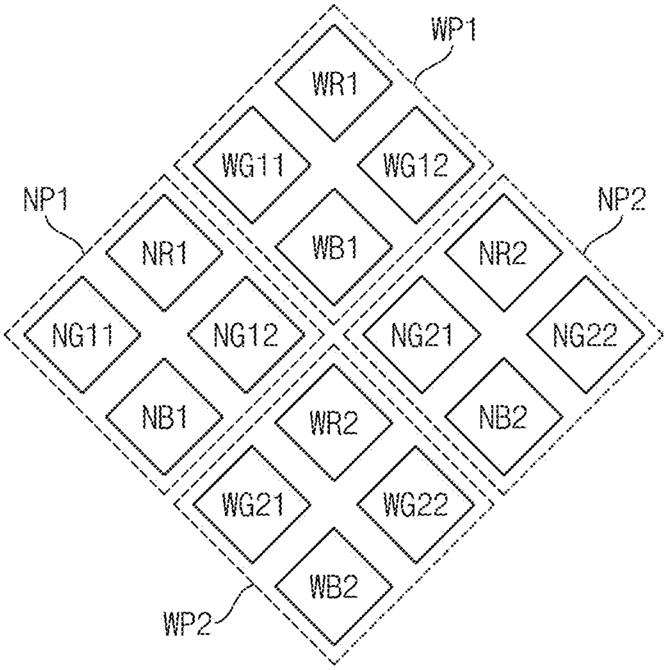
FIG. 2 is a diagram illustrating pixels of a display panel of FIG. 1 according to an embodiment.
Figure 3:
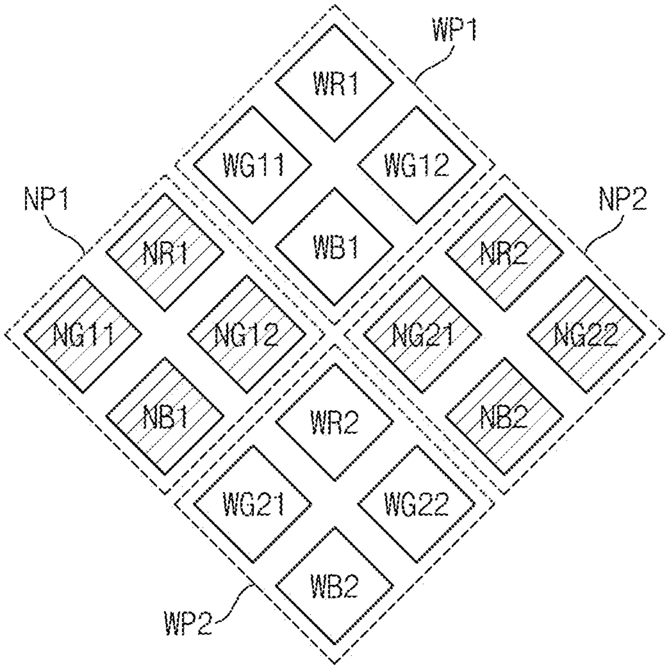
FIG. 3 is a diagram illustrating the pixels of the display panel of FIG. 1 in a normal operation period according to an embodiment.
Figure 4:
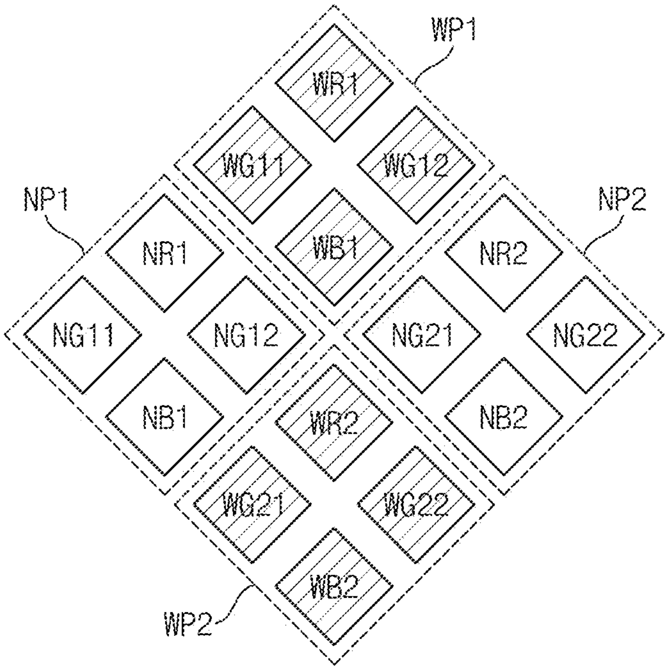
FIG. 4 is a diagram illustrating the pixels of the display panel of FIG. 1 in a viewing angle control operation period according to an embodiment.

FIG. 2 is a diagram illustrating pixels of the display panel 100 of FIG. 1 according to an embodiment. FIG. 3 is a diagram illustrating the pixels of the display panel 100 of FIG. 1 in a normal operation period according to an embodiment. FIG. 4 is a diagram illustrating the pixels of the display panel 100 of FIG. 1 in a viewing angle control operation period according to an embodiment.

Referring to FIGS. 1 to 4, the display panel 100 may include normal pixels and viewing angle control pixels (e.g., privacy pixels). The viewing angle control pixels may be privacy pixels to be controlled for implementing a privacy mode. The normal pixels may be referred to as wide pixels. The viewing angle control pixels may be referred to as narrow pixels. Each of the viewing angle control pixels may have a viewing angle that is narrower than the viewing angle of the normal pixels.

A side luminance of a viewing angle control pixel (as perceived by a user from a side of the display panel 100) may be less than a front luminance of the viewing angle control pixel perceived by a user from a front surface of the display panel. For example, the viewing angle control pixel may include a light blocking pattern disposed on a light emitting area. Due to the light blocking pattern, the side luminance of the viewing angle control pixel may be perceived to be lower than the front luminance of the viewing angle control pixel.

A front luminance of the normal pixel (as perceived by a user from a front surface of the display panel 100) may be substantially the same as a front luminance of the viewing angle control pixel perceived by a user from the front surface of the display panel 100. A side luminance of the normal pixel (as perceived by a user from a side of the display panel 100) may be greater than the side luminance of the viewing angle control pixel as perceived by a user from a side of the display panel 100.

The front luminance of the normal pixel may be substantially the same as the side luminance of the normal pixel. In contrast, the front luminance of the viewing angle control pixel may be greater than the side luminance of the viewing angle control pixel. For example, the side luminance of the viewing angle control pixel may be equal to or less than a predetermined percentage (e.g., half) of the front luminance of the viewing angle control pixel.

The display panel 100 may include viewing angle control pixels and normal pixels arranged in a predetermined pattern. An example is shown in FIG. 2 that the predetermined pattern is a diamond pattern, but the normal pixels and the viewing angle control pixels may be arranged in a different pattern in another embodiment.

Referring to FIG. 2, the display panel may include a first color first normal pixel WR1 disposed in a first pixel row, a second color 1-1 normal pixel WG11 and a second color 1-2 normal pixel WG12 sequentially disposed in a second pixel row, a first color first viewing angle control pixel NR1, a third color first normal pixel WB1 and a first color second viewing angle control pixel NR2 sequentially disposed in a third pixel row, a second color 1-1 viewing angle control pixel NG11, a second color 1-2 viewing angle control pixel NG12, a second color 2-1 viewing angle control pixel NG21 and a second color 2-2 viewing angle control pixel NG22 sequentially disposed in a fourth pixel row, a third color first viewing angle control pixel NB1, a first color second normal pixel WR2 and a third color second viewing angle control pixel NB2 sequentially disposed in a fifth pixel row, a second color 2-1 normal pixel WG21 and a second color 2-2 normal pixel WG22 sequentially disposed in a sixth pixel row and a third color second normal pixel WB2 disposed in a seventh pixel row. Herein, the first color is red, the second color is green and the third color is blue. In FIGS. 2 and 4, a normal pixel may mean a light emitting area of the normal pixel, and a viewing angle control pixel may mean a light emitting area of the viewing angle control pixel.

In the display panel 100, each normal pixel may include to green pixels, but the arrangement and number of pixels may vary among embodiments. For example, each normal pixel may include one light emitting area of a red pixel, one light emitting area of a blue pixel, and two light emitting areas of green pixels disposed in a diamond shape. For example, WR1, WG11, WG12 and WB1 may be disposed in a diamond shape. WR1, WG11, WG12 and WB1 may be referred to as one unit pixel group (a normal pixel group WP1). For example, each viewing angle control pixel may include pixels NR1, NG11, NG12 and NB1 disposed in a diamond shape. NR1, NG11, NG12 and NB1 may be referred to as one unit pixel group (a viewing angle control pixel group NP1). For example, WR2, WG21, WG22 and WB2 may be disposed in a diamond shape. WR2, WG21, WG22 and WB2 may be one unit pixel group (a normal pixel group WP2). For example, NR2, NG21, NG22 and NB2 may be disposed in a diamond shape. NR2, NG21, NG22 and NB2 may be one unit pixel group (a viewing angle control pixel group NP2).

In the present embodiment, the display panel driver may determine a normal operation period (in which at least the normal pixel emits light) and a viewing angle control operation period (in which at least the viewing angle control pixel emits light) in a unit driving period.

As shown in FIG. 3, the normal pixel may emit light but the viewing angle control pixel may not emit a light in the normal operation period. For example, in the normal operation period, the first color first normal pixel WR1, the second color 1-1 normal pixel WG11, the second color 1-2 normal pixel WG12, the third color first normal pixel WB1, the first color second normal pixel WR2, the second color 2-1 normal pixel WG21, the second color 2-2 normal pixel WG22 and the third color second normal pixel WB2 may emit light. In the normal operation period, the first color first viewing angle control pixel NR1, the second color 1-1 viewing angle control pixel NG11, the second color 1-2 viewing angle control pixel NG12, the third color first viewing angle control pixel NB1, the first color second viewing angle control pixel NR2, the second color 2-1 viewing angle control pixel NG21, the second color 2-2 viewing angle control pixel NG22 and the third color second viewing angle control pixel NB2 may not emit light.

In contrast, as shown in FIG. 4, the viewing angle control pixel may emit light but the normal pixel may not emit a light in the viewing angle control operation period. Thus, for example, the normal pixels and the viewing angle control pixels may be operated in an alternating light emission pattern or may emit light at different degrees depending on the operational state. For example, in the viewing angle control operation period, the first color first normal pixel WR1, the second color 1-1 normal pixel WG11, the second color 1-2 normal pixel WG12, the third color first normal pixel WB1, the first color second normal pixel WR2, the second color 2-1 normal pixel WG21, the second color 2-2 normal pixel WG22 and the third color second normal pixel WB2 may not emit light. In the viewing angle control operation period, the first color first viewing angle control pixel NR1, the second color 1-1 viewing angle control pixel NG11, the second color 1-2 viewing angle control pixel NG12, the third color first viewing angle control pixel NB1, the first color second viewing angle control pixel NR2, the second color 2-1 viewing angle control pixel NG21, the second color 2-2 viewing angle control pixel NG22 and the third color second viewing angle control pixel NB2 may emit light.

Figure 5:
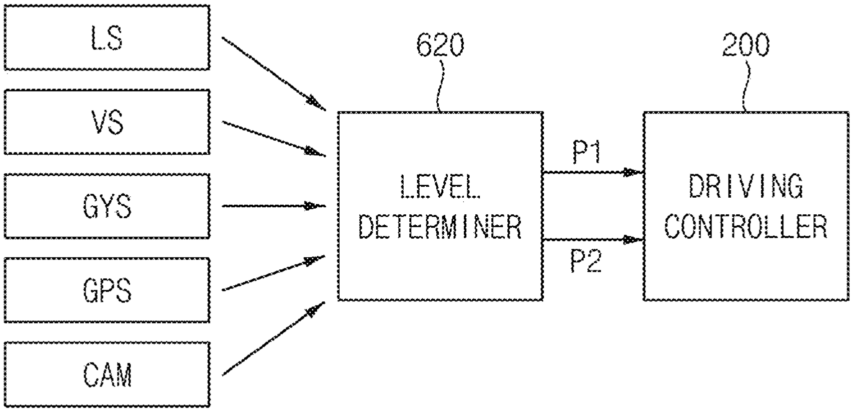
FIG. 5 is a block diagram illustrating a level determiner and a driving controller of the display apparatus of FIG. 1 according to an embodiment.
Figures 6, 7A:
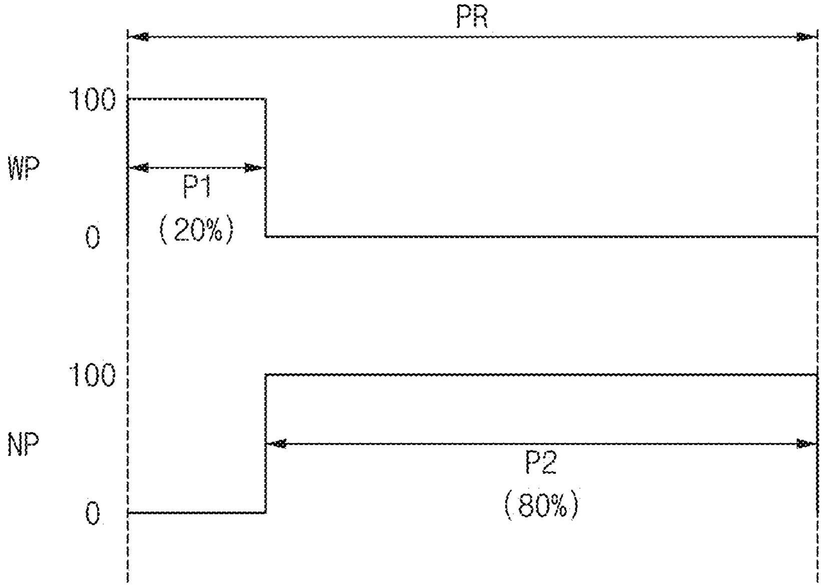
FIG. 6 is a table illustrating an example of a ratio of the normal operation period and a ratio of the viewing angle control operation period according to a state of the display apparatus of FIG. 1.
FIG. 7A is a timing diagram illustrating a light emitting degree of a normal pixel and a light emitting degree of a viewing angle control pixel in a semi privacy state (e.g., the normal operation period: the viewing angle control operation period=20%: 80%) of FIG. 6 according to an embodiment.

FIG. 5 is a block diagram illustrating a level determiner 620 and the driving controller 200 of the display apparatus of FIG. 1 according to an embodiment. FIG. 6 is a table illustrating an example of a ratio of the normal operation period P1 and a ratio of the viewing angle control operation period P2 according to different operational states (or modes) of the display apparatus of FIG. 1.

FIG. 7A is a timing diagram illustrating an example of a light emitting degree of the normal pixel WP and a light emitting degree of the viewing angle control pixel NP in the semi privacy state (e.g., where the normal operation period P1: the viewing angle control operation period P2=20%: 80%) of FIG. 6 according to an embodiment.

Figure 7B:
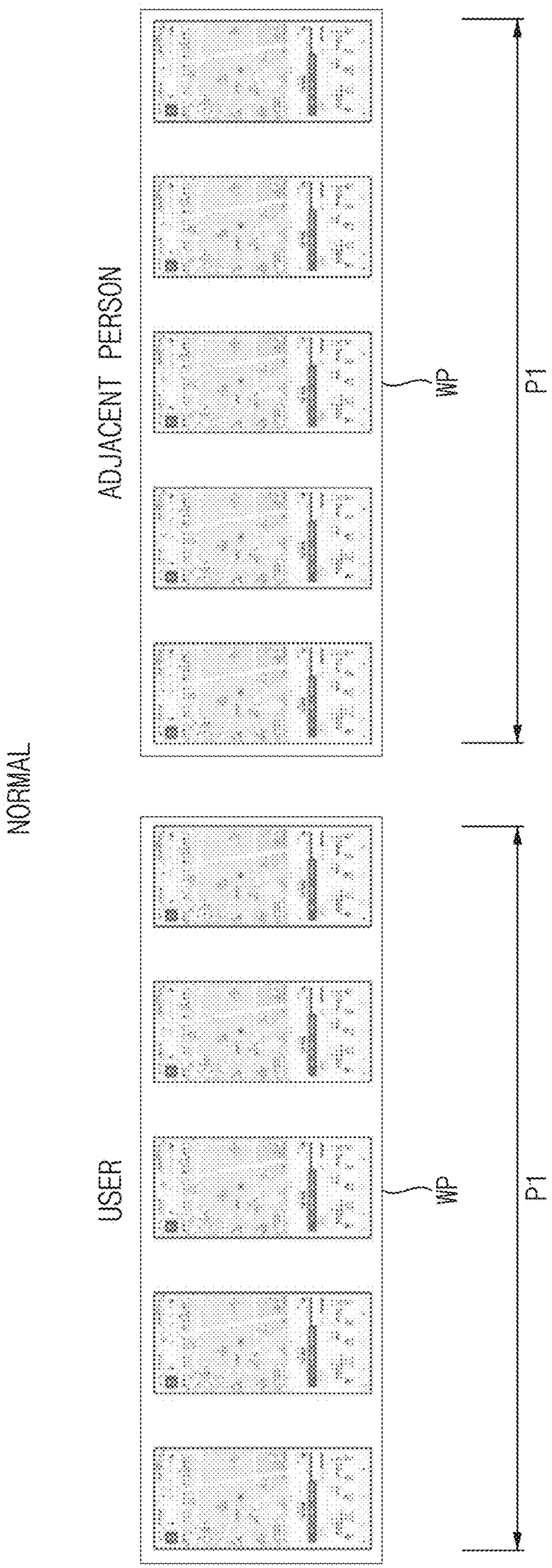
FIG. 7B illustrates an example of a user recognition image and an adjacent person recognition image in a normal state (e.g., the normal operation period: the viewing angle control operation period=100%: 0%) of FIG. 6.

FIG. 7B illustrates a user recognition image and an adjacent person recognition image displayed in a normal state (e.g., where the normal operation period P1: the viewing angle control operation period P2=100%: 0%) of FIG. 6 according to an embodiment.

Figure 7C:
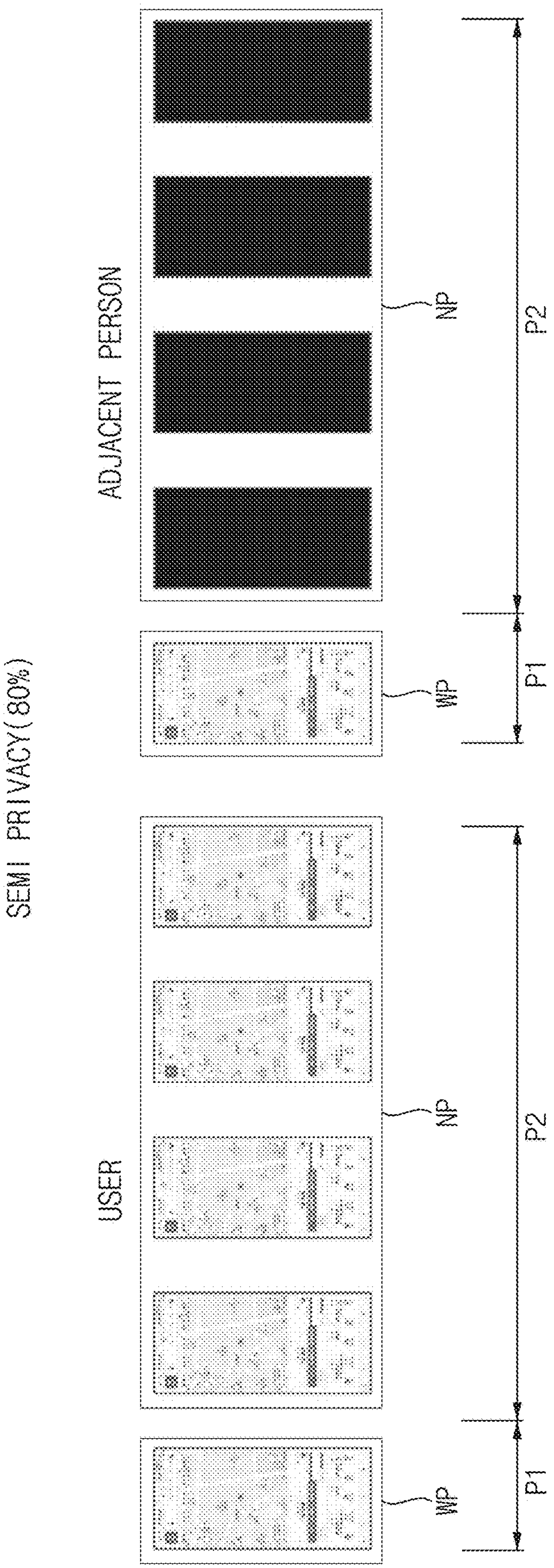
FIG. 7C illustrates an example of the user recognition image and the adjacent person recognition image in the semi privacy state (e.g., the normal operation period: the viewing angle control operation period=20%: 80%) of FIG. 6.

FIG. 7C illustrates the user recognition image and the adjacent person recognition image in the semi privacy state (e.g., where the normal operation period P1: the viewing angle control operation period P2=20%: 80%) of FIG. 6 according to an embodiment.

Figure 7D:
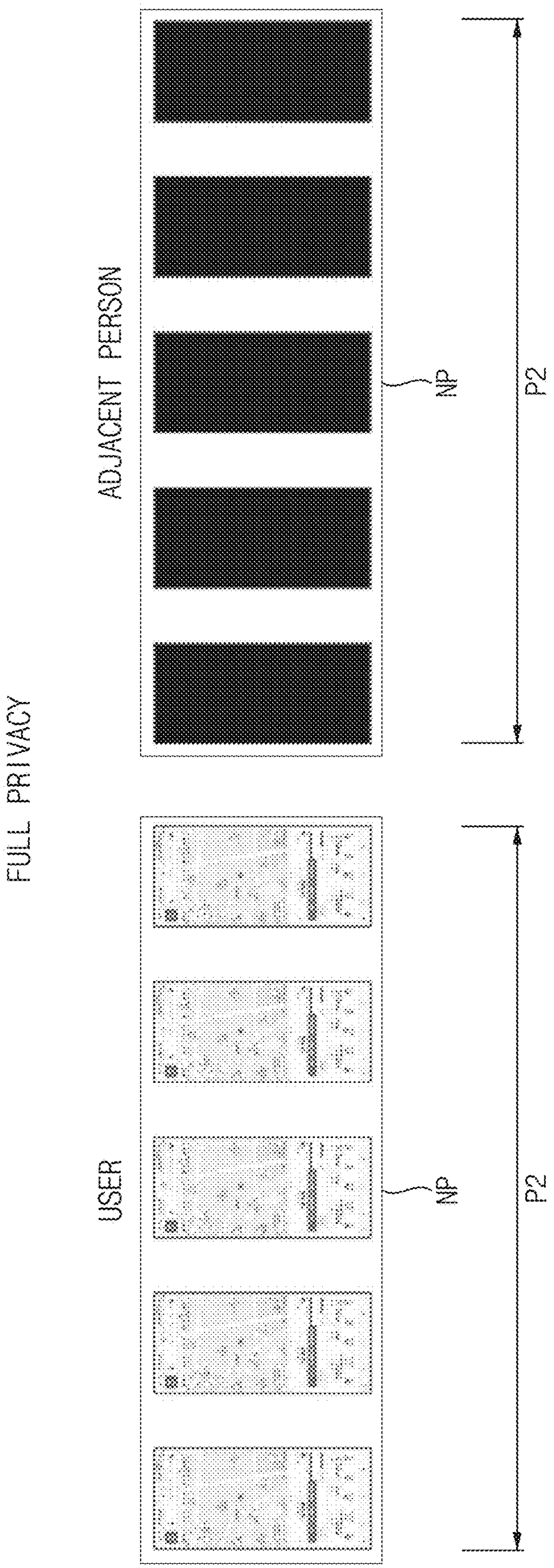
FIG. 7D illustrates an example of the user recognition image and the adjacent person recognition image in a full privacy state (e.g., the normal operation period: the viewing angle control operation period=0%: 100%) of FIG. 6.

FIG. 7D illustrates the user recognition image and the adjacent person recognition image in a full privacy state (e.g., where the normal operation period P1: the viewing angle control operation period P2=0%: 100%) of FIG. 6 according to an embodiment.

FIG. 8 is a table illustrating an example of a state of the display apparatus of FIG. 1, the ratio of the normal operation period P1 and the ratio of the viewing angle control operation period P2 according to a privacy off mode OFF, a privacy auto mode AUTO, a privacy on mode ON and user situations according to an embodiment of the invention.

Referring to FIGS. 1 to 8, the display panel driver may include a level determiner 620 determining a normal operation period P1 (in which at least the normal pixel WP emits light) and a viewing angle control operation period P2 (in which at least the viewing angle control pixel NP emits light) in a unit driving period. For example, the level determiner 620 may be disposed in the host 600. The host 600 may be an element in the display apparatus or as an element external to the display apparatus. The level determiner 620 may output signals corresponding to the normal operation period P1 and the viewing angle control operation period P2 to the driving controller 200.

The level determiner 620 may determine a normal state in which the ratio of the normal operation period P1 is 100% in the unit driving period PR, a full privacy state in which the ratio of the viewing angle control operation period P2 is 100% in the unit driving period PR and a semi privacy state in which the ratio of the normal operation period P1 is greater than 0% and less than 100% and the ratio of the viewing angle control operation period P2 is greater than 0% and less than 100% in the unit driving period PR. For example, referring to FIG. 6, the ratio of the normal operation period P1 is 40% and the ratio of the viewing angle control operation period P2 is 60% in the semi privacy state. For example, the ratio of the normal operation period P1 is 30% and the ratio of the viewing angle control operation period P2 is 70% in the semi privacy state. For example, the ratio of the normal operation period P1 is 20% and the ratio of the viewing angle control operation period P2 is 70% in the semi privacy state. For example, the ratio of the normal operation period P1 is 10% and the ratio of the viewing angle control operation period P2 is 90% in the semi privacy state. These percentages are only examples and may be different on other embodiments.

For example, the level determiner 620 may automatically determine the normal state (in which the ratio of the normal operation period P1) is 100% in the unit driving period PR, the full privacy state (in which the ratio of the viewing angle control operation period P2 is 100%) in the unit driving period PR, and the semi privacy state (in which the ratio of the normal operation period P1 is greater than 0% and less than 100% and the ratio of the viewing angle control operation period P2 is greater than 0% and less than 100%) in the unit driving period PR according to the environment of the user.

In FIG. 7A, the ratio between the normal operation period P1 and the viewing angle control operation period P2 may be 20%: 80%. In other embodiments, the ratio between the normal operation period P1 and the viewing angle control operation period P2 may be another ratio, e.g., one different from 20%: 80%.

In the normal operation period P1, the normal pixel WP may emit light but the viewing angle control pixel NP may not emit light. In the viewing angle control operation period P2, the viewing angle control pixel NP may emit light but the normal pixel WP may not emit light.

In the present embodiment, the light emitting degree of the normal pixel WP may be 100% and the light emitting degree of the viewing angle control pixel NP may be 0% in the normal operation period P1. The light emitting degree of the viewing angle control pixel NP may be 100% and the light emitting degree of the normal pixel WP may be 0% in the viewing angle control operation period P2.

FIG. 7B represents the user recognition image and the adjacent person recognition image (who is located on one side of the user) in the normal state in which the ratio between the normal operation period P1 and the viewing angle control operation period P2 is 100%: 0%. The normal state may not have any privacy protection. The normal pixel WP has a wide viewing angle that emits a light in the normal state. Thus, in the normal state, the image may be clearly shown to both the user on a front surface of the display panel and an adjacent person located one a side of the user.

FIG. 7C represents the user recognition image and the adjacent person recognition image who is on the user's side in the semi privacy state, in which the ratio between the normal operation period P1 and the viewing angle control operation period P2 is 20%: 80%. In FIG. 7C, the normal pixel WP having the wide viewing angle emits light in the normal operation period P1 (which, in this example, is 20% of the unit driving period PR) and the viewing angle control pixel NP having a narrow viewing angle emits light in the viewing angle control operation period P2, which is 80% of the unit driving period. Herein, the image may be clearly shown to the user looking at the front surface of the display panel, but the image may be shown to an adjacent person (who is on the user's side) only for the 20% of the unit driving period. A time period when the image is shown to the adjacent person who is on the user's side may be properly adjusted, such that the adjacent person who is on the user's side cannot clearly perceive the image.

For example, even if the ratio of the normal operation period P1 to the viewing angle control operation period P2 is changed within the unit driving period PR, the width of the normal operation period P1 may be set to be in a predetermined time range. A predetermined time in the predetermined time range may make it difficult for the adjacent person (who is on the user's side) to clearly perceive the image. For example, the predetermined time may be less than one second, but may be a different time in another embodiment.

For example, when the ratio of the normal operation period P1 to the viewing angle control operation period P2 is changed within the unit driving period PR, the width of the unit driving period PR and the width of the viewing angle control operation period P2 may be changed, but the width of the normal operation period P1 may not be changed. Even if the width of the unit driving period PR and the width of the viewing angle control operation period P2 are changed, but the width of the normal operation period P1 is fixed, it is difficult for the adjacent person (who is on the user's side) to clearly perceive the image. Thus, privacy protection may be well achieved.

FIG. 7D represents the user recognition image and the adjacent person recognition image (who is on the user's side) in the full privacy state, in which the ratio between the normal operation period P1 and the viewing angle control operation period P2 is 0%: 100%. The full privacy state is the privacy protection state, so that only the viewing angle control pixels NP having the narrow viewing angle emits light in the full privacy state. Thus, in the full privacy state, the image may be clearly shown to the user on the front surface of the display panel, but is not shown at all to the adjacent person who is on the user's side.

Referring again to FIG. 5, the display apparatus may include a plurality of sensors LS, VS, GYS, GPS and CAM. The sensors may be defined as elements in the display apparatus or as elements external to the display apparatus. For example, the display apparatus may include a light sensor LS, a vibration sensor VS, a gyro sensor GYS, a position sensor GPS and a camera CAM. The display apparatus may further include an infrared sensor. Although five sensors are shown in FIG. 5, in other embodiments the display apparatus may include more or less than five sensors.

In one embodiment, the level determiner 620 may determine whether there are one or more adjacent persons around the user. When there is no adjacent person around the user, the level determiner 620 may determine the state of the display apparatus as the normal state. When there is no adjacent person around the user, the need for the privacy operation is extremely low, so that the state of the display apparatus may be determined as the normal state. When there is at least one adjacent person around the user, the level determiner 620 may determine the state of the display apparatus as the full privacy mode or the semi privacy state.

For example, the level determiner 620 may determine whether there are one or more adjacent persons around the user using camera data and/or infrared sensed data. For example, the level determiner 620 may detect adjacent persons around the user through the camera data or the infrared sensed data.

In one embodiment, the level determiner 620 may determine whether the user is outdoors or indoors. The ratio of the viewing angle control operation period P2 in the unit driving period PR when the user is outdoors may be lower than the ratio of the viewing angle control operation period P2 in the unit driving period PR when the user is indoors, e.g., the size of the viewing angle control period may be greater when the user is indoors (where more privacy is needed) than when the user is outdoors. When the user is outdoors, the need for the privacy operation is relatively low compared to when the user is indoors.

For example, the level determiner 620 may determine whether the user is outdoors or indoors using one or more of light sensed data, vibration sensed data, gyro sensed data, or position sensed data. For example, when surroundings are determined to be very bright based on the light sensed data, there is a high possibility that the user is determined to be outdoors. For example, when the value of the vibration sensed data and the value of the gyro sensed data are high (e.g., greater than predetermined thresholds), there is a high possibility that the user is outdoors. For example, when a change of the value of the position sensed data is high, there is a high possibility that the user will be determined to be outdoors.

In one embodiment, the level determiner 620 may determine whether the user is outdoors or indoors by additionally using camera data. For example, the level determiner 620 may analyze the camera data (or input the camera data into an artificial intelligence neural network) to determine whether the user is outdoors or indoors.

In one embodiment, the level determiner 620 may determine the degree of movement of the user. As the degree of movement of the user decreases, the level determiner 620 may increase the ratio of the viewing angle control operation period P2 in the unit driving time PR. When the degree of movement of the user is great, the need for the privacy operation is relatively low and therefore the viewing angle control operation period P2 may be decreased.

For example, the level determiner 620 may determine the degree of movement of the user using the vibration sensed data, the gyro sensed data, and/or the position sensed data. For example, when a value of the vibration sensed data and a value of the gyro sensed data are high (e.g., above a predetermined value), there is a high possibility that the degree of movement of the user is determined to be high. For example, when a change of a value of the position sensed data is high, there is a high possibility that the degree of movement of the user is determined to be high.

As shown in FIG. 8, for example, when there is no adjacent person around the user, the state of the display apparatus may be determined as the normal state.

For example, when the user is outdoors, the user is moving, the degree of movement of the user is equal to or greater than a first level and there is one or more adjacent persons around the user, the level determiner 620 may determine the ratio of the viewing angle control operation period P2 in the unit driving period PR to be a first ratio (e.g. 50%).

For example, when the user is outdoors, the user is moving, the degree of movement of the user is less than the first level and there one or more adjacent persons around the user, the level determiner 620 may determine the ratio of the viewing angle control operation period P2 in the unit driving period PR to be a second ratio (e.g. 60%) greater than the first ratio.

For example, when the user is outdoors, the user is not moving and there are one or more adjacent persons around the user, the level determiner 620 may determine the ratio of the viewing angle control operation period P2 in the unit driving period PR to be a third ratio (e.g. 70%) greater than the second ratio.

For example, when the user is indoors, the user is moving, the degree of movement of the user is equal to or greater than the first level, and there are one or more adjacent persons around the user, the level determiner 620 may determine the ratio of the viewing angle control operation period P2 in the unit driving period PR to be a fourth ratio (e.g. 80%) greater than the first ratio.

For example, when the user is indoors, the user is moving, the degree of movement of the user is less than the first level, and there is the adjacent person around the user, the level determiner 620 may determine the ratio of the viewing angle control operation period P2 in the unit driving period PR to be a fifth ratio (e.g. 90%) greater than the fourth ratio.

For example, when the user is indoors, the user is not moving and there are one or more adjacent persons around the user, the level determiner 620 may determine the state of the display apparatus as the full privacy state.

Thus, according to the present embodiment, the display panel 100 may include normal pixels and viewing angle control pixels and the display panel driver may operate in variable privacy levels according to user's situations. The state of the display apparatus may be automatically determined to one of the normal state, the semi privacy state and the full privacy state according to the user's situations. In the semi privacy state, the ratio between the normal operation period P1 and the viewing angle control operation period P2 may be adjusted between 0% and 100% according to the user's situation.

As a result, the privacy security of the display apparatus may be enhanced by preventing the user's personal information from being exposed to people around the user while the normal mode is fixed. In addition, a decrease in the lifespan of the display apparatus due to the excessive use of the normal pixels or the viewing angle control pixels, as compared to when the normal mode or the privacy mode is fixed for a long time by the user setting, may be prevented.

Figure 9:
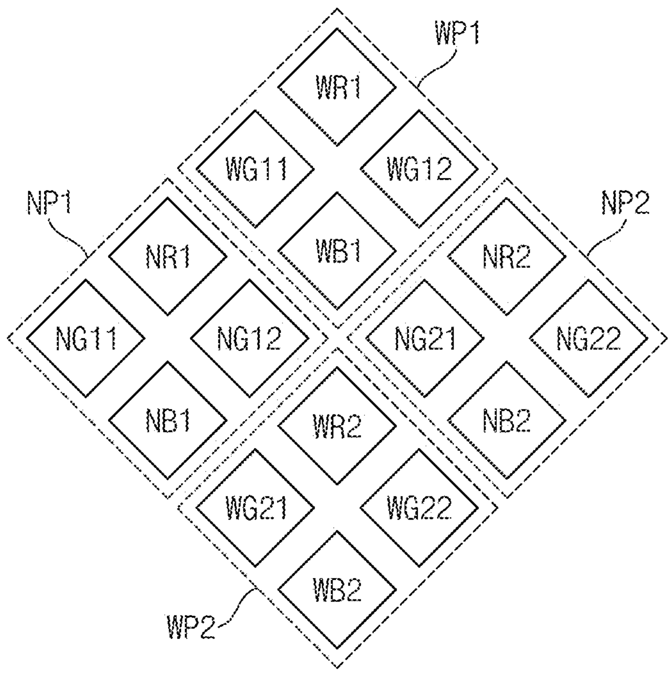
FIG. 9 is a drawing illustrating pixels of a display panel of a display apparatus according to an embodiment of the present inventive concept.
Figure 10:
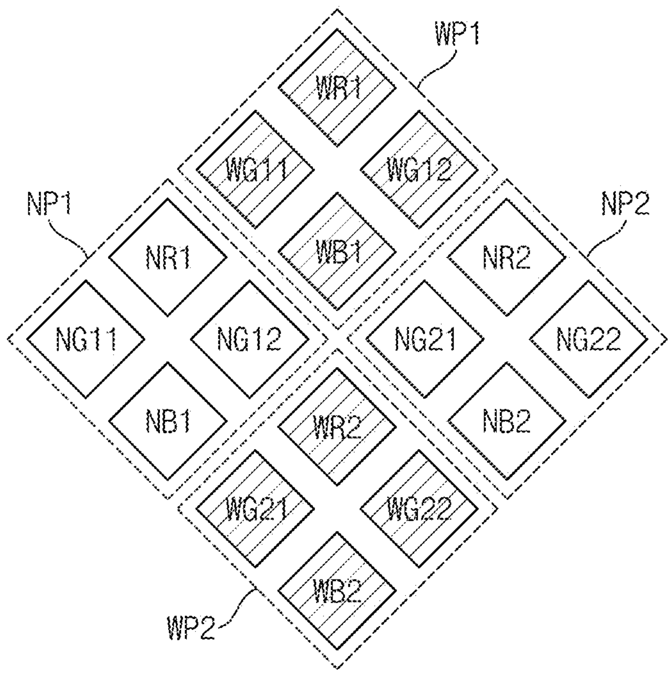
FIG. 10 is a diagram illustrating the pixels of the display panel of FIG. 9 in a viewing angle control operation period according to an embodiment.
Figures 11, 12:
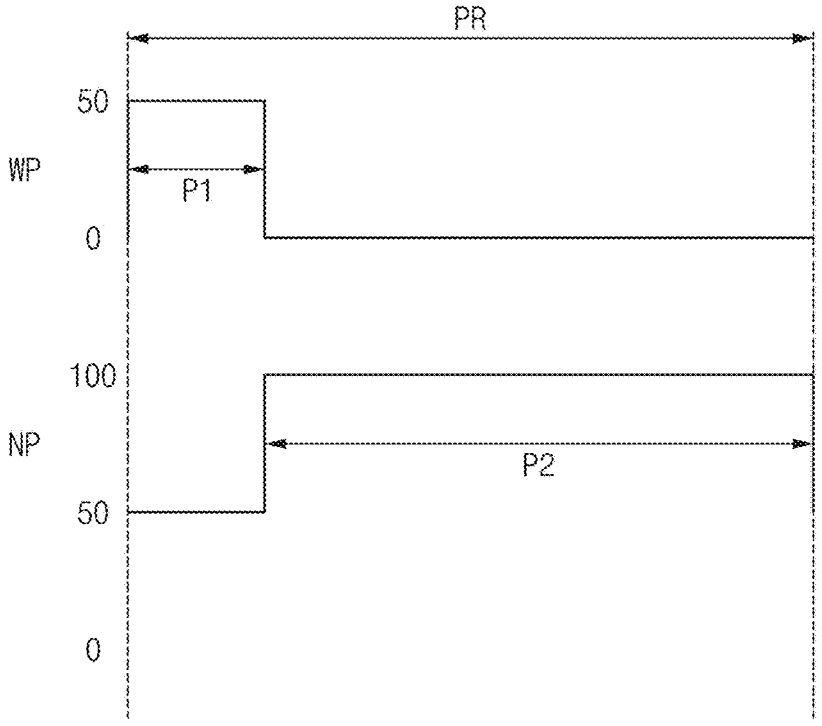
FIG. 11 is a table illustrating a ratio of the normal operation period and a ratio of the viewing angle control operation period according to a state of the display apparatus of FIG. 9 according to an embodiment.
FIG. 12 is a timing diagram illustrating a light emitting degree of a normal pixel and a light emitting degree of a viewing angle control pixel in a semi privacy state (e.g., the normal operation period: the viewing angle control operation period=20%: 80%) of FIG. 11 according to an embodiment.

FIG. 9 illustrates pixels of a display panel 100 of a display apparatus according to an embodiment of the present inventive concept. FIG. 10 illustrates the pixels of the display panel of 100 FIG. 9 in a viewing angle control operation period according to an embodiment. FIG. 11 is a table illustrating an example of a ratio of the normal operation period P1 to the viewing angle control operation period P2 according to a state of the display apparatus of FIG. 9 according to an embodiment. FIG. 12 is a timing diagram illustrating a light emitting degree of a normal pixel and a light emitting degree of a viewing angle control pixel in a semi privacy state (e.g., the normal operation period P1: the viewing angle control operation period P2=20%: 80%) of FIG. 11 according to an embodiment.

The display apparatus according to the present embodiment may be substantially the same as the display apparatus of the previous embodiment explained referring to FIGS. 1 to 8, except that both the normal pixels and the viewing angle control pixels emit light in the normal operation period. The same reference numerals will be used to refer to the same or like parts as those described in the previous embodiment of FIGS. 1 to 8.

In the present embodiment, the display panel driver may determine a normal operation period (in which at least the normal pixel emits light) and a viewing angle control operation period (in which at least the viewing angle control pixel emits light) in a unit driving period.

As shown in FIG. 9, a normal pixel and a viewing angle control pixel may emit light in the normal operation period. In the normal operation period, the first color first normal pixel WR1, the second color 1-1 normal pixel WG11, the second color 1-2 normal pixel WG12, the third color first normal pixel WB1, the first color second normal pixel WR2, the second color 2-1 normal pixel WG21, the second color 2-2 normal pixel WG22 and the third color second normal pixel WB2 may emit light. In the normal operation period, the first color first viewing angle control pixel NR1, the second color 1-1 viewing angle control pixel NG11, the second color 1-2 viewing angle control pixel NG12, the third color first viewing angle control pixel NB1, the first color second viewing angle control pixel NR2, the second color 2-1 viewing angle control pixel NG21, the second color 2-2 viewing angle control pixel NG22 and the third color second viewing angle control pixel NB2 may emit light.

In contrast, as shown in FIG. 10, the viewing angle control pixel may emit light but the normal pixel may not emit a light in the viewing angle control operation period. In the viewing angle control operation period, the first color first normal pixel WR1, the second color 1-1 normal pixel WG11, the second color 1-2 normal pixel WG12, the third color first normal pixel WB1, the first color second normal pixel WR2, the second color 2-1 normal pixel WG21, the second color 2-2 normal pixel WG22 and the third color second normal pixel WB2 may not emit light. In the viewing angle control operation period, the first color first viewing angle control pixel NR1, the second color 1-1 viewing angle control pixel NG11, the second color 1-2 viewing angle control pixel NG12, the third color first viewing angle control pixel NB1, the first color second viewing angle control pixel NR2, the second color 2-1 viewing angle control pixel NG21, the second color 2-2 viewing angle control pixel NG22 and the third color second viewing angle control pixel NB2 may emit light.

The display panel driver may include a level determiner 620 (see, e.g., FIG. 5) determining a normal operation period P1 (in which at least the normal pixel WP emits light) and a viewing angle control operation period P2 (in which at least the viewing angle control pixel NP emits light) in a unit driving period.

The level determiner 620 may determine a normal state in which the ratio (or value) of the normal operation period P1 is 100% in the unit driving period PR, a full privacy state in which the ratio (or value) of the viewing angle control operation period P2 is 100% in the unit driving period PR and a semi privacy state in which the ratio (or value) of the normal operation period P1 is greater than 0% and less than 100% and the ratio (or value) of the viewing angle control operation period P2 is greater than 0% and less than 100% in the unit driving period PR.

In FIG. 12, the ratio between the normal operation period P1 and the viewing angle control operation period P2 may be 20%: 80%. This ratio may be different in other embodiments. In the normal operation period P1, the normal pixel WP and the viewing angle control pixel NP may emit light. In the viewing angle control operation period P2, the viewing angle control pixel NP may emit light but the normal pixel WP may not emit light.

In the present embodiment, the light emitting degree of the normal pixel WP may be 50% and the light emitting degree of the viewing angle control pixel NP may be 50% in the normal operation period P1. The light emitting degree of the viewing angle control pixel NP may be 100% and the light emitting degree of the normal pixel WP may be 0% in the viewing angle control operation period P2.

According to the present embodiment, the display panel 100 may include the normal pixel and the viewing angle control pixel, and the display panel driver may operate in variable privacy levels according to user's situations. The state of the display apparatus may be automatically determined to one of the normal state, the semi privacy state, or the full privacy state according to the user's situation. In the semi privacy state, the ratio between the normal operation period P1 and the viewing angle control operation period P2 may be adjusted between 0% and 100% according to the user's situation.

Through these features, the privacy security of the display apparatus may be enhanced by preventing the user's personal information from being exposed to people around the user while the normal mode is fixed. In addition, a decrease of the lifespan of the display apparatus, due to the excessive use of the normal pixel or the viewing angle control pixel when the normal mode or the privacy mode is fixed for a long time by a user setting, may be prevented.

Figure 13:
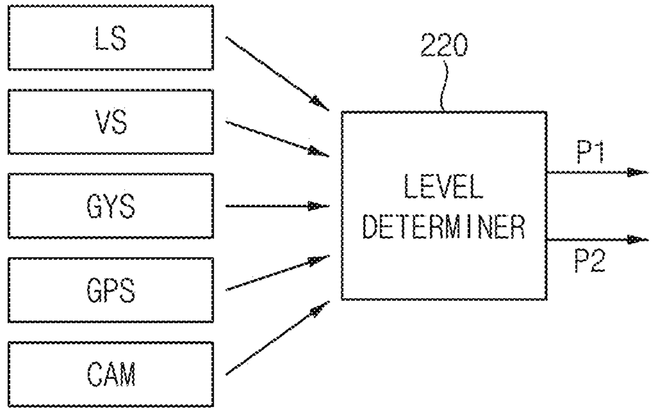
FIG. 13 is a block diagram illustrating a level determiner of a display apparatus according to an embodiment of the present inventive concept.

FIG. 13 is a block diagram illustrating a level determiner 220 of a display apparatus according to an embodiment of the present inventive concept. The display apparatus according to the present embodiment may be substantially the same as the display apparatus of the previous embodiment explained referring to FIGS. 1 to 8, except that the level determiner 220 is disposed in the driving controller. Thus, the same reference numerals will be used to refer to the same or like parts as those described in the previous embodiment of FIGS. 1 to 8.

Referring to FIGS. 1 to 4, 6 to 8 and 13, the display panel driver may include a gate driver 300 outputting a gate signal to the normal pixel and the viewing angle control pixel, a data driver 500 outputting data voltages to the normal pixel and the viewing angle control pixel, and a driving controller 200 controlling the gate driver 300 and the data driver 500. The level determiner 220 may be disposed in the driving controller 200.

The level determiner 220 may determine a normal operation period P1 (in which at least the normal pixel WP emits light) and a viewing angle control operation period P2 (in which at least the viewing angle control pixel NP emits light) in a unit driving period According to the present embodiment, the display panel 100 may include the normal pixel and the viewing angle control pixel, and the display panel driver may operate at variable privacy levels according to the user's situation. The state of the display apparatus may be automatically determined to one of the normal state, the semi privacy state, or the full privacy state according to the user's situation. In the semi privacy state, the ratio between the normal operation period P1 and the viewing angle control operation period P2 may be adjusted between 0% and 100% according to the user's situation.

Through these features, the privacy security of the display apparatus may be enhanced by preventing the user's personal information from being exposed to people around the user while the normal mode is fixed. In addition, a decrease of the lifespan of the display apparatus, due to the excessive use of the normal pixel or the viewing angle control pixel when the normal mode or the privacy mode is fixed for a long time by a user setting, may be prevented.

Figure 14:
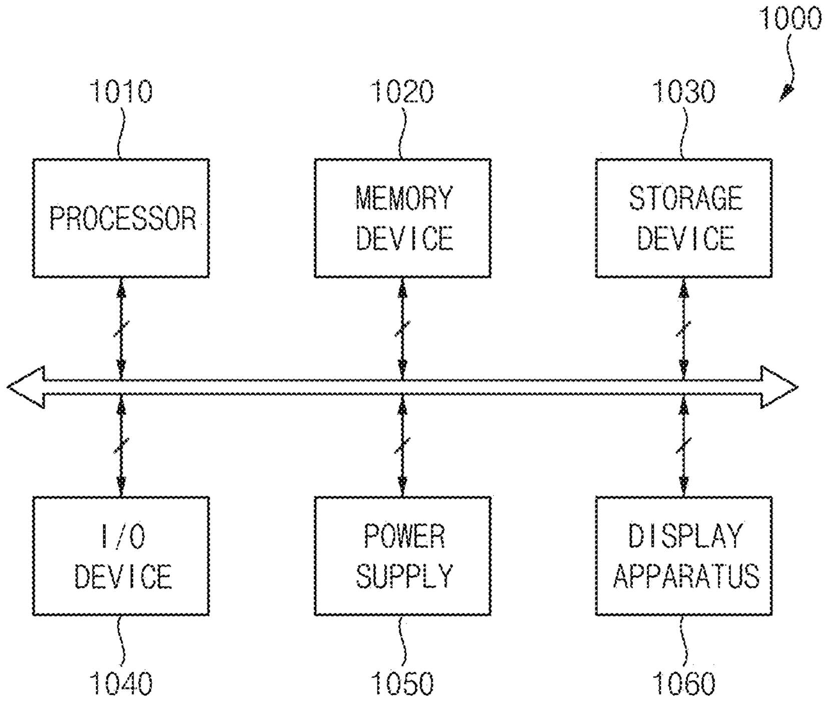
FIG. 14 is a block diagram illustrating an electronic apparatus according to an embodiment of the present inventive concept.
Figure 15:
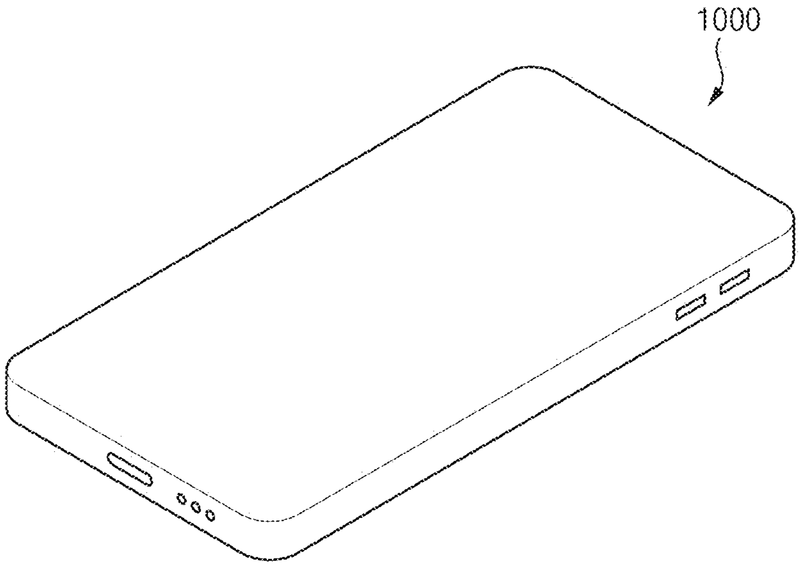
FIG. 15 is a diagram illustrating an example in which the electronic apparatus of FIG. 14 is implemented as a smartphone.

FIG. 14 is a block diagram illustrating an electronic apparatus 1000 according to an embodiment of the present inventive concept. FIG. 15 is a diagram illustrating an example in which the electronic apparatus 1000 of FIG. 14 is implemented as a smartphone Referring to FIGS. 14 and 15, the electronic apparatus 1000 may include a processor 1010, a memory device 1020, a storage device 1030, an input/output (I/O) device 1040, a power supply 1050, and a display apparatus 1060. Here, the display apparatus 1060 may be the display apparatus of FIG. 1. In addition, the electronic apparatus 1000 may further include a plurality of ports for communicating with a video card, a sound card, a memory card, a universal serial bus (USB) device, other electronic apparatuses, etc.

In an embodiment, as illustrated in FIG. 15, the electronic apparatus 1000 may be implemented as a smartphone. However, the electronic apparatus 1000 is not limited thereto. For example, the electronic apparatus 1000 may be implemented as a television, a monitor, a cellular phone, a video phone, a smart pad, a smart watch, a tablet PC, a car navigation system, a laptop, a head mounted display (HMD) device, and the like.

The processor 1010 may perform various computing functions or various tasks. The processor 1010 may be a micro-processor, a central processing unit (CPU), an application processor (AP), and the like. The processor 1010 may be coupled to other components via an address bus, a control bus, a data bus, etc. Further, the processor 1010 may be coupled to an extended bus such as a peripheral component interconnection (PCI) bus. The processor 1010 may output the input image data IMG and the input control signal CONT to the driving controller 200, as previously explained with reference to FIG. 1.

The memory device 1020 may store data for supporting operations of the electronic apparatus 1000. For example, the memory device 1020 may include at least one non-volatile memory device (such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, and the like) and/or at least one volatile memory device such as a dynamic random access memory (DRAM) device, a static random access memory (SRAM) device, a mobile DRAM device, and the like.

The storage device 1030 may include a solid state drive (SSD) device, a hard disk drive (HDD) device, a CD-ROM device, and the like. The I/O device 1040 may include an input device such as a keyboard, a keypad, a mouse device, a touch-pad, a touch-screen, and the like and an output device such as a printer, a speaker, and the like. In some embodiments, the display apparatus 1060 may be included in the I/O device 1040. The power supply 1050 may provide power for supporting operations of the electronic apparatus 1000. The display apparatus 1060 may be coupled to other components via the buses or other communication links.

Figure 16:
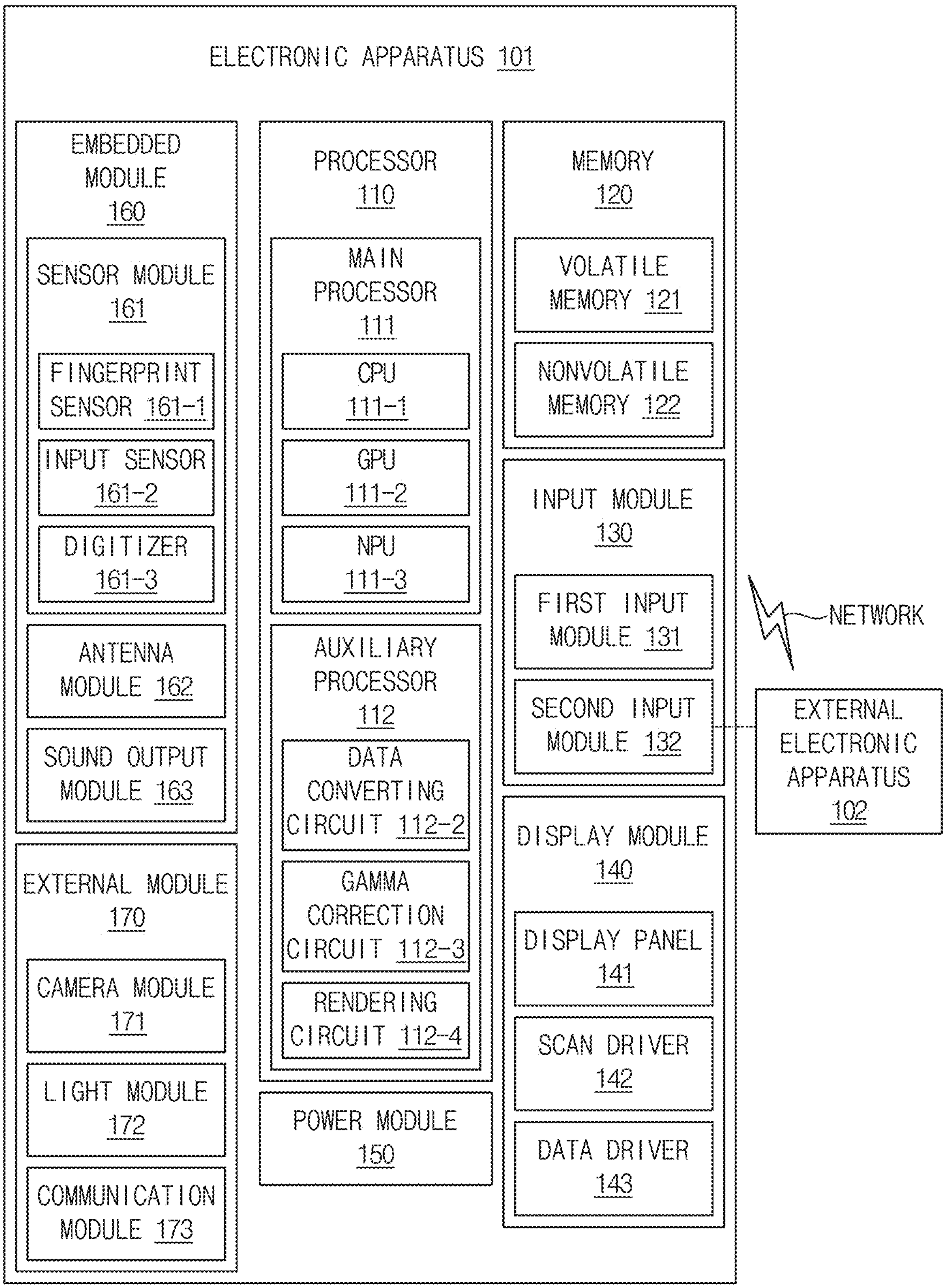
FIG. 16 is a block diagram illustrating an electronic apparatus according to an embodiment of the present inventive concept.

FIG. 16 is a block diagram illustrating an electronic apparatus 101 according to an embodiment of the present inventive concept. The electronic apparatus 101 may include a processor 110, a memory 120, an input module 130, a display module 140, a power module 150, an embedded module 160, and an external module 170. These features are explained in greater detail below.

Referring to FIGS. 1 to 16, the electronic apparatus 101 outputs various information through the display module 140 in an operating system. When a processor 110 executes an application stored in the memory 120, the display module 140 provides application information to a user through a display panel 141.

The processor 110 obtains an external input through the input module 130 or a sensor module 161 in the embedded module 160 and executes an application corresponding to the external input. For example, when the user selects a camera icon displayed on the display panel 141, the processor 110 obtains a user input through an input sensor 161-2 of the sensor module 161 and activates a camera module 171 in the external module 170. The processor 110 transfers image data corresponding to a captured image obtained through the camera module 171 to the display module 140. The display module 140 may display an image corresponding to the captured image through the display panel 141 of the display module 140.

In an embodiment, when personal information authentication is executed in the display module 140, a fingerprint sensor 161-1 in the sensor module 161 obtains input biometric information (e.g., fingerprint information) as input data. The processor 110 compares input data obtained through the fingerprint sensor 161-1 with authentication data stored in the memory 120, and executes an application according to a comparison result. The display module 140 may display information executed according to application logic through the display panel 141 of the display module. The display panel 141 may correspond to the embodiments of the display panel previously described.

In an embodiment, when a music streaming icon displayed on the display module 140 is selected, the processor 110 obtains a user input through the input sensor 161-2 and activates a music streaming application stored in the memory 120. When a music execution command is input in the music streaming application, the processor 110 activates a sound output module 163 in the sensor module 161 to provide sound information corresponding to the music execution command to the user.

Operation of the electronic apparatus 101 has been briefly described. Hereinafter, a configuration of the electronic apparatus 101 will be described in detail. Some of elements of the electronic apparatus 101 described later may be integrated and provided as one element, or one element may be separated as two or more elements.

The electronic apparatus 101 may communicate with an external electronic apparatus 102 through a network (e.g. a short-range wireless communication network or a long-range wireless communication network). According to an embodiment, as previously indicated, the electronic apparatus 101 may include the processor 110, the memory 120, the input module 130, the display module 140, the power module 150, the embedded module 160, and the external module 170. According to an embodiment, in the electronic apparatus 101, at least one of the above-described elements may be omitted or one or more other apparatus may be added. According to an embodiment, some of the above-described elements (e.g., the sensor module 161, an antenna module 162 or the sound output module 163) may be integrated into another element (e.g. the display module 140).

The processor 110 may execute software to control at least one other element (e.g. hardware or software element) of the electronic apparatus 101 connected to the processor 110 and to perform various data processing or operations. According to an embodiment, as at least part of the data processing or the operations, the processor 110 may store receive instructions or data from other elements (e.g. the input module 130, the sensor module 161 or a communication module 173) in a volatile memory 121, may process the instructions or data stored in the volatile memory 121 and may store result data of the processing in a nonvolatile memory 122.

The processor 110 may include a main processor 111 and an auxiliary processor 112. The main processor 111 may include at least one of a central processing unit (CPU) 111-1 or an application processor (AP). The main processor 111 may further include any one or more of a graphic processing unit (GPU) 111-2, a communication processor (CP), or an image signal processor (ISP). The main processor 111 may further include a neural network processing unit (NPU) 111-3. The neural network processing unit 111-3 is a processor specialized in processing an artificial intelligence model. The artificial intelligence model may be generated (e.g., trained), for example, through machine learning. In one embodiment, the artificial intelligence model may include a plurality of artificial neural network layers. The artificial neural network may be one of a deep neural network (DNN), a convolutional neural network (CNN), a recurrent neural network (RNN), a restricted boltzmann machine (RBM), a deep belief network (DBN), a bidirectional recurrent deep neural network (BRDNN), a deep Q-networks, or a combination of two or more of the above. However, the artificial neural network is not limited to the above examples. The artificial intelligence model may include software structures, in addition to hardware structures or instead of the hardware structures. At least two of the above-described processing units and the above-described processors may be implemented as an integrated element (e.g. a single chip) or each may be implemented as independent elements (e.g. in a plurality of chips).

The auxiliary processor 112 may include a controller. The controller may include an interface conversion circuit and a timing control circuit. The controller receives an image signal from the main processor 111, converts a data format of the image signal to meet interface specifications with the display module 140, and outputs image data. The controller may output various control signals for driving the display module 140.

The auxiliary processor 112 may further include a data converting circuit 112-2, a gamma correction circuit 112-3, and a rendering circuit 112-4. The data converting circuit 112-2 may receive the image data from the controller and may compensate the image data such that the image is displayed with a desired luminance according to characteristics of the electronic apparatus 101 or a user setting, or may convert the image data to reduce power consumption or to compensate for afterimages. The gamma correction circuit 112-3 may convert the image data or a gamma reference voltage such that the image displayed on the electronic apparatus 101 has desired gamma characteristics. The rendering circuit 112-4 may receive the image data from the controller and may render the image data based on a pixel arrangement of the display panel 141 included in the electronic apparatus 101. At least one of the data converting circuit 112-2, the gamma correction circuit 112-3, or the rendering circuit 112-4 may be integrated into another element (e.g. the main processor 111 or the controller). At least one of the data converting circuit 112-2, the gamma correction circuit 112-3, or the rendering circuit 112-4 may be integrated into a data driver 143 to be described later.

The memory 120 may store various data used by at least one element (e.g. the processor 110 or the sensor module 161) of the electronic apparatus 101 and input data or output data for commands related thereto. The memory 120 may include at least one of the volatile memory 121 or the nonvolatile memory 122.

The input module 130 may receive commands and/or data, for use by the elements (e.g. the processor 110, the sensor module 161 or the sound output module 163) of the electronic apparatus 101, from an external source (or host) of the electronic apparatus 101 (e.g. the user or the external electronic apparatus 102).

The input module 130 may include a first input module 131 for receiving commands and/or data from the user and a second input module 132 for receiving commands and/or data from the external electronic apparatus 102. The first input module 131 may include, for example, a microphone, a mouse, a keyboard, a key (e.g. a button) or a pen (e.g. a passive pen or an active pen). The second input module 132 may support a designated protocol capable of connecting to the external electronic apparatus 102 by wire or wirelessly. According to an embodiment, the second input module 132 may include a high definition multimedia interface (HDMI), a universal serial bus (USB) interface, an SD card interface, and/or an audio interface. The second input module 132 may include a connector physically connected to the external electronic apparatus 102, for example, an HDMI connector, a USB connector, an SD card connector, or an audio connector (e.g. a headphone connector).

The display module 140 visually provides information to the user. The display module 140 may include the display panel 141, a scan driver 142, and the data driver 143. The display panel 141 may correspond to any of the embodiments of the display panel discussed herein. The display module 140 may further include a window, a chassis and a bracket to protect the display panel 141.

The display panel 141 may be a liquid crystal display panel, an organic light emitting display panel or an inorganic light emitting display panel. The type of the display panel 141 is not particularly limited. The display panel 141 may be a rigid type or a flexible type capable of being rolled or folded. The display module 140 may further include a supporter or a heat dissipation member supporting the display panel 141.

The scan driver 142 may be mounted on the display panel 141 as a driving chip. In one embodiment, the scan driver 142 may be integrated on the display panel 141. For example, the scan driver 142 may include an amorphous silicon TFT gate driver circuit (ASG) integrated on the display panel 141, a low temperature polycrystalline silicon (LTPS) TFT gate driver circuit integrated on the display panel 141, or an oxide semiconductor TFT gate driver circuit (OSG) integrated on the display panel 141. The scan driver 142 receives a control signal from the controller and outputs the scan signals to the display panel 141 in response to the control signal.

The display module 140 may further include a light emission driver. The light emission driver outputs a light emission control signal to the display panel 141 in response to a control signal received from the controller. The light emission driver may be formed independently from the scan driver 142. In one embodiment, the light emission driver and the scan driver 142 may be integrally formed.

The data driver 143 receives a control signal from the controller and converts the image data into an analog voltage (e.g. the data voltage) and output the data voltages to the display panel 141 in response to the control signal. The data driver 143 may be integrated into another element (e.g. the controller). The functions of the interface conversion circuit and the timing control circuit of the controller described above may be integrated into the data driver 143.

The display module 140 may further include a voltage generating circuit. The voltage generating circuit may output various voltages for driving the display panel 141.

The power module 150 supplies power to elements of the electronic apparatus 101. The power module 150 may include a battery which supplies a power voltage. The battery may include a non-rechargeable primary cell, a rechargeable secondary cell or a fuel cell. The power module 150 may include a power management integrated circuit (PMIC). The PMIC supplies optimized power to each of the above-described modules and modules described later. The power module 150 may include a wireless power transmission/reception member electrically connected to the battery. The wireless power transmission/reception member may include a plurality of antenna radiators in a form of coils.

The electronic apparatus 101 may further include the embedded module 160 and the external module 170. The embedded module 160 may include the sensor module 161, the antenna module 162 and the sound output module 163. The external module 170 may include the camera module 171, a light module 172 and the communication module 173. In one embodiment, the external module may include any of the sensors previously described with reference to FIGS. 5 and 13.

The sensor module 161 may detect an input by a user's body (e.g., a touch) or an input by the pen or stylus among the first input module 131, and generate an electrical signal or data value corresponding to the input. The sensor module 161 may include at least one of the fingerprint sensor 161-1, the input sensor 161-2, or a digitizer 161-3.

The fingerprint sensor 161-1 may generate a data value corresponding to a user's fingerprint. The fingerprint sensor 161-1 may include one of an optical fingerprint sensor or a capacitive fingerprint sensor.

The input sensor 161-2 may generate data values corresponding to coordinate information of the input by the user's body or the input by the pen or stylus. The input sensor 161-2 generates a capacitance change due to an input as a data value. The input sensor 161-2 may detect an input by the passive pen or transmit/receive data to/from the active pen.

The input sensor 161-2 may measure biosignals such as blood pressure, moisture, or body fat. For example, when a user touches a part of his body to a sensor layer or a sensing panel and does not move for a certain period of time, the input sensor 161-2 may detect a biosignal based on a change in an electric field caused by the part of the body, so that the display module 140 may output user's desired information.

The digitizer 161-3 may generate a data value corresponding to the coordinate information input by the pen. The digitizer 161-3 generates an amount of electromagnetic change based on the input as a data value. The digitizer 161-3 may detect an input by the passive pen or transmit/receive data to/from the active pen.

At least one of the fingerprint sensor 161-1, the input sensor 161-2, or the digitizer 161-3 may be formed as a sensor layer on the display panel 141 through a continuous process. The fingerprint sensor 161-1, the input sensor 161-2 and the digitizer 161-3 may be disposed on the display panel 141, which may correspond to any of the embodiments described herein. At least one of the fingerprint sensor 161-1, the input sensor 161-2, or the digitizer 161-3 (for example, the digitizer 161-3) may be disposed under the display panel 141.

At least two or more of the fingerprint sensor 161-1, the input sensor 161-2, or the digitizer 161-3 may be integrated into the sensing panel through the same process. When at least two or more of the fingerprint sensor 161-1, the input sensor 161-2 or the digitizer 161-3 are integrated into the sensing panel, the sensing panel may be disposed between the display panel 141 and a window disposed over an upper surface of the display panel 141. According to an embodiment, the sensing panel may be disposed on the window. The present inventive concept may not be limited to a position of the sensing panel.

At least one of the fingerprint sensor 161-1, the input sensor 161-2 or the digitizer 161-3 may be embedded in the display panel 141. For example, at least one of the fingerprint sensor 161-1, the input sensor 161-2 or the digitizer 161-3 may be formed simultaneously with the display panel 141 through a process of forming elements included in the display panel 141 (e.g. light emitting elements (pixels), transistors, etc.).

In addition, the sensor module 161 may generate an electrical signal or a data value corresponding to an internal state or an external state of the electronic apparatus 101. For example, the sensor module 161 may further include a gesture sensor, a gyro sensor, a barometric pressure sensor, a magnetic sensor, an acceleration sensor, a grip sensor, a proximity sensor, a color sensor, an IR (infrared) sensor, a biosensor, a temperature sensor, a humidity sensor, and/or an illuminance sensor.

The antenna module 162 may include one or more antennas for transmitting a signal or power to an external system or receiving a signal or power from an external source. According to an embodiment, the communication module 173 may transmit a signal to an external electronic apparatus or receive a signal from an external electronic apparatus through an antenna suitable for a communication method. An antenna pattern of the antenna module 162 may be integrated with an element of the display module 140 (e.g. the display panel 141) or the input sensor 161-2.

The sound output module 163 outputs sound signals to the outside of the electronic apparatus 101. For example, the sound output module 163 may include a speaker used for general purposes such as playing multimedia or recording and a receiver used exclusively for receiving a call. According to an embodiment, the receiver may be formed integrally with or separately from the speaker. A sound output pattern of the sound output module 163 may be integrated with the display module 140.

The camera module 171 may capture still images and moving images. According to an embodiment, the camera module 171 may include one or more lenses, an image sensor or an image signal processor. The camera module 171 may further include an infrared camera capable of determining a presence or an absence of a user, the user's location and the user's gaze. The camera module 171 may correspond to the camera module CAM previously discussed.

The light module 172 may provide light. The light module 172 may include, for example, a light emitting diode or a xenon lamp. The light module 172 may operate in conjunction with the camera module 171 or may operate independently.

The communication module 173 may support establishment of a wired or wireless communication channel between the electronic apparatus 101 and the external electronic apparatus 102 and communication through the established communication channel. The communication module 173 may include one or both of a wireless communication module (such as a cellular communication module, a short-distance wireless communication module, or a global navigation satellite system (GNSS) communication module) and a wired communication module such as a local area network (LAN) communication module, or a power line communication module. The communication module 173 may communicate with the external electronic apparatus 102 through a short-range communication network (such as Bluetooth, WiFi direct or infrared data association (IrDA)) or a long-distance communication network such as a cellular network, the Internet, or a computer network (e.g. LAN or WAN). The various types of communication modules 173 described above may be implemented as a single chip or may be implemented as separate chips.

The input module 130, the sensor module 161 and the camera module 171 may be used to control the operation of the display module 140 in conjunction with the processor 110.

The processor 110 outputs commands or data to the display module 140, the sound output module 163, the camera module 171 and/or the light module 172 based on the input data received from the input module 130. For example, the processor 110 may generate image data corresponding to input data applied through a mouse or an active pen, and output the generated image data to the display module 140, or the processor 110 may generate command data corresponding to the input data and output the generated command data to the camera module 171 or the light module 172. When input data is not received from the input module 130 for a certain period of time, the processor 110 may convert an operation mode of the electronic apparatus 101 into a low power mode or a sleep mode, so that a power consumption of the electronic apparatus 101 may be reduced.

The processor 110 outputs commands or data to the display module 140, the sound output module 163, the camera module 171 and/or the light module 172 based on sensed data received from the sensor module 161. For example, the processor 110 may compare authentication data applied by the fingerprint sensor 161-1 with authentication data stored in the memory 120, and then execute an application according to the comparison result. The processor 110 may execute commands or output corresponding image data to the display module 140 based on the sensed data sensed by the input sensor 161-2 or the digitizer 161-3. When the sensor module 161 includes a temperature sensor, the processor 110 may receive temperature data for the temperature measured from the sensor module 161 and may further perform luminance correction on the image data based on the temperature data.

The processor 110 may receive determined data about the presence or the absence of the user, the user's location and the user's gaze from the camera module 171. In some embodiments the processor 110 may receive information indicating whether there is an adjacent person relative to the display panel. Control of the normal pixels and the viewing angle control pixel may then be performed as previously described.

The processor 110 may further perform luminance correction on the image data based on the determined data. For example, the processor 110, which determines the presence or the absence of the user through an input from the camera module 171, may display image data having the luminance corrected by the data converting circuit 112-2 or the gamma correction circuit 112-3 to the display module 140.

Some of the above elements may be connected to each other through a communication method between peripheral devices such as a bus, a general purpose input/output (GPIO), a serial peripheral interface (SPI), a mobile industry processor interface (MIPI), or a ultra path interconnect (UPI) link to exchange signals (e.g. commands or data) with each other. The processor 110 may communicate with the display module 140 through an agreed or predetermined interface. For example, the processor 110 may communicate with the display module 140 through any one of the above communication methods. The present invention may not be limited to the above communication methods.

The electronic apparatus 101 according to various embodiments disclosed in the disclosure may be various types of apparatuses. For example, the electronic apparatus 101 may include at least one of a monitor, a portable communication apparatus (e.g. a smart phone), a computer apparatus, a portable multimedia apparatus, a portable medical apparatus, a camera, a wearable device and a home appliance. The electronic apparatus 101 according to the embodiment of the disclosure may not be limited to the aforementioned apparatuses.

Features of the display panel may be correlated to the embodiments previously described herein. For example, the display panel 100 of FIG. 1 may correspond to the display panel 141 of FIG. 16. For example, the driving controller 200 of FIG. 1 may correspond to the controller of the auxiliary processor 112 of FIG. 16. For example, the gate driver 300 of FIG. 1 may correspond to the scan driver 142 of FIG. 16. For example, the data driver 500 of FIG. 1 may correspond to the data driver 143 of FIG. 16.

According to the embodiments of the display apparatus, the electronic apparatus including the display apparatus and the method of driving the display apparatus, the lifespan degradation of the display panel may be prevented and the degradation of the privacy security of the display apparatus may be prevented.

The foregoing is illustrative of the present inventive concept and is not to be construed as limiting thereof. Although a few embodiments of the present inventive concept have been described, those skilled in the art will readily appreciate that many modifications are possible in the embodiments without materially departing from the novel teachings and advantages of the present inventive concept. Accordingly, all such modifications are intended to be included within the scope of the present inventive concept as defined in the claims. In the claims, means-plus-function clauses are intended to cover the structures described herein as performing the recited function and not only structural equivalents but also equivalent structures. Therefore, it is to be understood that the foregoing is illustrative of the present inventive concept and is not to be construed as limited to the specific embodiments disclosed, and that modifications to the disclosed embodiments, as well as other embodiments, are intended to be included within the scope of the appended claims. The present inventive concept is defined by the following claims, with equivalents of the claims to be included therein. The embodiments may be combined to form additional embodiments.

What is claimed is:

1. A display apparatus comprising:

a display panel including a normal pixel and a viewing angle control pixel, the viewing angle control pixel having a viewing angle less than a viewing angle of the normal pixel; and a display panel driver configured to drive the display panel, wherein the display panel driver comprises a level determiner configured to determine a normal operation period in which at least the normal pixel emits light and a viewing angle control operation period in which at least the viewing angle control pixel emits light, the normal operation period and the viewing angle control operation period included in a unit driving period, and wherein the level determiner is configured to determine a semi privacy state in which a ratio of the normal operation period is greater than 0% and less than 100% and a ratio of the viewing angle control operation period is greater than 0% and less than 100% in the unit driving period, according to an environment of a user.

2. The display apparatus of claim 1, wherein the level determiner is configured to automatically determine:

a normal state in which the ratio of the normal operation period is 100% in the unit driving period, and a full privacy state in which the ratio of the viewing angle control operation period is 100% in the unit driving period.

3. The display apparatus of claim 2, wherein:

the level determiner is configured to determine whether there are one or more adjacent persons around the user, when there are no adjacent persons around the user, the level determiner is configured to determine a state of the display apparatus as the normal state, and when there are one or more adjacent persons around the user, the level determiner is configured to determine the state of the display apparatus as the full privacy state or the semi privacy state.

4. The display apparatus of claim 3, wherein the level determiner is configured to determine whether there are one or more adjacent persons around the user using at least one of camera data or infrared sensed data.

5. The display apparatus of claim 2, wherein:

the level determiner is configured to determine whether the user is outdoors or indoors, and the ratio of the viewing angle control operation period in the unit driving period when the user is determined to be outdoors is less than the ratio of the viewing angle control operation period in the unit driving period when the user is determined to be indoors.

6. The display apparatus of claim 5, wherein the level determiner is configured to determine whether the user is outdoors or indoors using at least one of light sensed data, vibration sensed data, gyro sensed data, or position sensed data.

7. The display apparatus of claim 6, wherein the level determiner is configured to determine whether the user is outdoor or indoor further using camera data.

8. The display apparatus of claim 2, wherein:

the level determiner is configured to determine a degree of movement of the user, and as the degree of the movement of the user decreases, the level determiner is configured to increase the ratio of the viewing angle control operation period in the unit driving period.

9. The display apparatus of claim 8, wherein the level determiner is configured to determine the degree of the movement of the user using at least one of vibration sensed data, gyro sensed data or position sensed data.

10. The display apparatus of claim 2, wherein:

the level determiner is configured to determine whether there are one or more adjacent persons around the user, whether the user is outdoors or indoors, and a degree of movement of the user, when there are no adjacent persons around the user, the level determiner is configured to determine a state of the display apparatus as the normal state, when the user is outdoors, the user is moving, the degree of the movement of the user is equal to or greater than a first level and there are one or more adjacent persons around the user, the level determiner is configured to determine the ratio of the viewing angle control operation period in the unit driving period to a first ratio, when the user is outdoors, the user is moving, the degree of the movement of the user is less than the first level and there are one or more adjacent persons around the user, the level determiner is configured to determine the ratio of the viewing angle control operation period in the unit driving period to a second ratio greater than the first ratio, when the user is outdoors, the user is not moving and there are one or more adjacent persons around the user, the level determiner is configured to determine the ratio of the viewing angle control operation period in the unit driving period to a third ratio greater than the second ratio, when the user is indoors, the user is moving, the degree of the movement of the user is equal to or greater than the first level and there are one or more adjacent persons around the user, the level determiner is configured to determine the ratio of the viewing angle control operation period in the unit driving period to a fourth ratio greater than the first ratio, when the user is indoors, the user is moving, the degree of the movement of the user is less than the first level and there are one or more adjacent persons around the user, the level determiner is configured to determine the ratio of the viewing angle control operation period in the unit driving period to a fifth ratio greater than the fourth ratio, and when the user is indoors, the user is not moving and there are one or more adjacent persons around the user, the level determiner is configured to determine the state of the display apparatus as the full privacy state.

11. The display apparatus of claim 1, wherein:

the normal pixel is configured to emit light, but the viewing angle control pixel is configured not to emit light, in the normal operation period, and the viewing angle control pixel is configured to emit light, but the normal pixel is configured not to emit light, in the viewing angle control operation period.

12. The display apparatus of claim 11, wherein:

a light emitting degree of the normal pixel is 100% and a light emitting degree of the viewing angle control pixel is 0% in the normal operation period, and the light emitting degree of the viewing angle control pixel is 100% and the light emitting degree of the normal pixel is 0% in the viewing angle control operation period.

13. The display apparatus of claim 1, wherein:

the normal pixel and the viewing angle control pixel are configured to emit light in the normal operation period, and the viewing angle control pixel is configured to emit light, but the normal pixel is configured not to emit light, in the viewing angle control operation period.

14. The display apparatus of claim 13, wherein:

a light emitting degree of the normal pixel is 50% and a light emitting degree of the viewing angle control pixel is 50% in the normal operation period, and the light emitting degree of the viewing angle control pixel is 100% and the light emitting degree of the normal pixel is 0% in the viewing angle control operation period.

15. The display apparatus of claim 1, wherein:

even when a ratio of the normal operation period and a ratio of the viewing angle control operation period are changed within the unit driving period, a width of the normal operation period is configured to be set to be in a predetermined time range.

16. The display apparatus of claim 15, wherein:

when the ratio of the normal operation period and the ratio of the viewing angle control operation period are changed within the unit driving period, a width of the unit driving period and a width of the viewing angle control operation period are changed but a width of the normal operation period is not changed.

17. The display apparatus of claim 1, wherein the display panel driver comprises:

a gate driver configured to output a gate signal to the normal pixel and the viewing angle control pixel;

a data driver configured to output a data voltage to the normal pixel and the viewing angle control pixel;

a driving controller configured to control the gate driver and the data driver; and a host configured to output input image data and an input control signal to the driving controller, wherein the level determiner is disposed in the host.

18. The display apparatus of claim 1, wherein the display panel driver comprises:

a gate driver configured to output a gate signal to the normal pixel and the viewing angle control pixel;

a data driver configured to output a data voltage to the normal pixel and the viewing angle control pixel; and a driving controller configured to control the gate driver and the data driver, wherein the level determiner is disposed in the driving controller.

19. An electronic apparatus comprising:

a display panel including a normal pixel and a viewing angle control pixel, the viewing angle control pixel having a viewing angle less than a viewing angle of the normal pixel;

a gate driver configured to output a gate signal to the normal pixel and the viewing angle control pixel;

a data driver configured to output a data voltage to the normal pixel and the viewing angle control pixel;

a driving controller configured to control the gate driver and the data driver;

a host configured to output input image data and an input control signal to the driving controller; and a plurality of sensors, wherein the host comprises a level determiner configured to determine a normal operation period in which at least the normal pixel emits light and a viewing angle control operation period in which at least the viewing angle control pixel emits light, the normal operation period and the viewing angle control operation period included in a unit driving period, and wherein the level determiner is configured to control a ratio of the normal operation period to be greater than 0% and less than 100% and a ratio of the viewing angle control operation period to be greater than 0% and less than 100%, based on sensed data of the sensors.

20. A method of driving a display apparatus, the method comprising:

determining a normal operation period in which at least a normal pixel emits light and a viewing angle control operation period in which at least a viewing angle control pixel emits light, the normal operation period and the viewing angle control operation period included in a unit driving period;

determining a semi privacy state in which a ratio of the normal operation period is greater than 0% and less than 100% and a ratio of the viewing angle control operation period is greater than 0% and less than 100% in the unit driving period;

outputting a gate signal to the normal pixel and the viewing angle control pixel; and outputting a data voltage to the normal pixel and the viewing angle control pixel, wherein the viewing angle control pixel has a viewing angle less than a viewing angle of the normal pixel.

21. A display apparatus comprising:

a display panel comprising:

a normal pixel having a first viewing angle; and a viewing angle control pixel having a second viewing angle less than the first viewing angle; and a display panel driver configured to control the normal pixel to emit light in a first period and to control the viewing angle control pixel to emit light in a second period following the first period, wherein a ratio of the first period to the second period included in a unit driving period varies based on an external condition.

22. The display apparatus of claim 21, wherein the external condition includes whether a person is adjacent to a user of a display device including the display panel.

23. The display apparatus of claim 21, wherein the external condition includes whether the display panel is indoors or outdoors.

* * * * *